United States Patent
Wolzien et al.

(10) Patent No.: US 9,654,731 B2
(45) Date of Patent: *May 16, 2017

(54) VIDEO CALL CENTER

(71) Applicant: THE VIDEO CALL CENTER, LLC, Palisades, NY (US)

(72) Inventors: Thomas R. Wolzien, Grandview-On-Hudson, NY (US); Laurence Thaler, Larchmont, NY (US); Alexander Maisey, White Plains, NY (US); William Milne, Valley Stream, NY (US); Tom Porpiglia, Palisades, NY (US)

(73) Assignee: THE VIDEO CALL CENTER, LLC, Palisades, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,567

(22) Filed: Jun. 30, 2014

(65) Prior Publication Data

US 2014/0317508 A1    Oct. 23, 2014

Related U.S. Application Data

(63) Continuation-in-part of application No. 13/589,643, filed on Aug. 20, 2012, now Pat. No. 8,767,031, and a continuation-in-part of application No. PCT/US2013/054924, filed on Aug. 14, 2013.

(51) Int. Cl.
*H04N 21/4788* (2011.01)
*H04N 21/431* (2011.01)
*H04N 7/15* (2006.01)
*H04M 3/56* (2006.01)
*H04N 7/14* (2006.01)

(52) U.S. Cl.
CPC .............. *H04N 7/15* (2013.01); *H04M 3/567* (2013.01); *H04N 7/147* (2013.01); *H04N 21/4316* (2013.01); *H04N 21/4788* (2013.01)

(58) Field of Classification Search
CPC ........... H04N 21/4788; H04N 21/4316; H04N 7/143; H04N 7/155; G06F 3/1423
See application file for complete search history.

(56) References Cited

U.S. PATENT DOCUMENTS

| | | | |
|---|---|---|---|
| 5,621,789 A | 4/1997 | McCalmont et al. | |
| 6,603,854 B1 | 8/2003 | Judkins et al. | |
| 2003/0013438 A1* | 1/2003 | Darby ........................ | 455/419 |
| 2007/0107008 A1 | 5/2007 | Dybus | |
| 2008/0297669 A1 | 12/2008 | Zalewski et al. | |
| 2009/0027482 A1* | 1/2009 | Emig et al. ................ | 348/14.02 |
| 2011/0310796 A1* | 12/2011 | Um et al. ..................... | 370/328 |
| 2012/0127259 A1 | 5/2012 | Mackie et al. | |
| 2013/0019259 A1* | 1/2013 | Pizzurro et al. ................ | 725/23 |
| 2013/0034262 A1* | 2/2013 | Surty et al. ................... | 382/103 |
| 2014/0049556 A1 | 2/2014 | Wolzien | |
| 2015/0142605 A1* | 5/2015 | Durante et al. ............ | 705/26.61 |

OTHER PUBLICATIONS

International Search Report and Written Opinion for PCT/US2015/038387 mailed Sep. 16, 2015 (17 pages).

* cited by examiner

*Primary Examiner* — Pinkal R Chokshi
(74) *Attorney, Agent, or Firm* — Steptoe & Johnson LLP

(57) ABSTRACT

A video call center process and system can create video programs for television transmission from a multiplicity of simultaneous video callers with much less supporting staff.

85 Claims, 22 Drawing Sheets

Host Automation Tool (HAT) Status Screen (Running)

Content Control Pad
(Video, Stills, Commercials)

Caller Control Pad
8 Callers Automation, Override,
Studio cameras & cutaways

VIDEO CALL CENTER

CLAIM OF PRIORITY

This application is a continuation-in-part of International Application No. PCT/US2013/54924, filed on Aug. 14, 2013, and a continuation-in-part of U.S. application Ser. No. 13/589,643, filed Aug. 20, 2012, and each of which is incorporated by reference in its entirety.

TECHNICAL FIELD

This invention relates to a process and system for production of video program incorporating multiplicity of internet video calls and associated conferencing device.

BACKGROUND

The advent of inexpensive video telephony via services/software such as Skype® opens the potential for video versions of caller-based talk radio. Video telephony has been used on television news and interview programs for a limited number of interviews, but programs with many viewers calling into the show have not been prevalent to date due to issues of cost benefits related to production and technical complexities and revenue limitations from audiences fractionalized by increased viewing options for the audience.

Commercial video programming is economically successful when revenues exceed program costs, but as the number of video outlets has increased, audiences have fractionalized, often reducing available revenues. As a result, many content services are under cost pressure, cannot afford to produce original content on a regular basis, and are relegated to re-running recorded content that has previously aired, such content having diminishing returns with the advent of alternate viewing options and digital video recorders. This is particularly true among secondary and tertiary cable networks and local television stations during daytime periods, and some operations in prime viewing periods as well. Original live program is generally cost prohibitive for such outlets.

A major component of program costs are those that occur in the live production of the program, including the costs of technical equipment, acquisition of content from remote locations, and personnel. The number of technical and production personnel is often directly related to the complexity of the production coupled with the broader operation of studios and control rooms designed for general use and therefore requiring, a high level of minimum staffing regardless of program type. Often a basic studio for live production at a television network requires a minimal technical crew of a technical director (who switches from a multiplicity of video inputs), an audio engineer, and a character generator operator responsible for creating and inserting into the video stream various names and titles. In addition, a production staff is necessary, including a producer, and various production assistants to make certain that such things as appropriate names are provided, to the character generator operator. Personnel costs for staffing a single television studio for a single shift for a year can cost more than one half million dollars, before payments to the on-air talent. In contrast, radio production requires far fewer personnel because the on-air talent often also runs the control "board" him/herself, and there is no need for a separate audio person, technical director, or character generator operator. In the case of the talk radio format, a producer often works with the on-air talent to pre-screen and coordinate incoming audio calls from the general public.

SUMMARY

A video call-in television system can include a plurality of video call central processing units for connecting a plurality of video calls from different callers via the internet, a caller acquisition module comprising a graphic user interface on at least one touch screen display used by an on-air talent and producer for selecting at least one video call to be aired, and an output unit for preparing and transmitting, the video call signal for transmission live to a video distributor. Each video call central processing unit is dedicated to a video call. Television can include over air broadcast, video streaming, or combinations thereof. Broadcasting, transmitting or connecting via the internet can include transmission of data by wireless or wired technology, including cellular, mobile, satellite, will, microwave or other mode, or combinations thereof.

In one aspect, the caller acquisition module runs on each video call central processing unit.

In another aspect, the caller acquisition module generates an audio identification tone for each caller, and has an option to turn on or turn off the audio identification.

In another aspect, the caller acquisition module generates a communication path to a voice-over-IP (VoIP) application, the VoIP application using the interact to make video telephone calls, and has an option to turn on or turn off the communication path.

In another aspect, the video call-in television system can include two or more video converters for converting video from the video call central processing units into television video.

In another aspect, each video call central processing unit generates a text identification or video call text overlay for a caller, and positions such text identification over the video call, prior to conversion of the video call to a video signal usable in live television with the text now integrated with the video call. The producer uses the caller acquisition module to set the text overlay to a home position, or any preset positions, to move the text around the screen, to lock the text in a specific position, and to hide the text. The producer can also use the caller acquisition module to enter the caller's name, caller's city, caller's topic, and other information of the caller to the text overlay. The producer can also use the caller acquisition module to send a caller's information to an information screen of the on-air talent and indicate that the caller is "cleared" for air by pressing a "Go" button. All cleared callers from a multiplicity of video call central processing units are listed on a caller screen by the caller acquisition module.

In another aspect, an amount of time spent after being cleared by a cleared callers from a multiplicity of video call central processing units is indicated on the caller screen using color coding and/or shades of color. Each caller is assigned with a priority level, and the priority of a caller is indicated on the caller screen using color coding and/or shades of color as determined by the producer.

In another aspect, the video call-in television system includes an ergonomically designed conference controller that permits the on-air talent to add video and audio of multiple callers when desired. The ergonomically designed conference controller includes a molded palm mirroring the on-air talent's palm is located on to assist in appropriately locating the on-air talent's hand and fingers in order to minimize errors while the on-air talent is making the selection and looking at a television camera In another aspect, the ergonomically designed conference controller permits the on-air talent to jump the video selection to the next in a series of pre-determined video combinations.

In another aspect, the ergonomically designed conference controller permits the on-air talent to jump the video selection to the next combination of the on-air talent and at least one caller in a series of pre-determined video combinations.

In another aspect, the ergonomically designed conference controller permits the on-air talent to remove herself from the pre-determined sequence of video combinations, leaving only callers in the sequence.

In another aspect, the ergonomically designed conference controller permits the on-air talent to position one caller in a dominant (featured guest) position on the screen and subsequent video combinations in the per-determined sequence.

In another aspect, the caller acquisition module generates audio communications via a multiplicity of tones to the on-air talent to indicate status of commands delivered through the ergonomically designed conference controller.

In another aspect, the ergonomically designed conference controller permits the on-air talent to air a plurality of basic program elements such as opens, closes and commercial breaks, a video recording, or video still, and to pause a predetermined sequence of video combinations or record the outgoing program.

In another aspect, the video call-in television system includes a "warning tally" light adjacent to each television camera for a next scheduled video picture according to a pre-determined sequence, or for the current video picture, indicating by arrow where the on-air talent looks for a next on-camera appearance according to a pre-determined sequence In another aspect, the "warning tally" light dynamically adjusts according to the on-air talent's changes to the pre-determined sequence through the ergonomically designed conference controller.

In another aspect, the video call central processing units generate an audio tone of varying frequencies (sweep tone) outside the range of most human hearing as part of the return audio feed to callers for the purpose of keeping automatic audio gain controls of the VoIP application active.

In another aspect, the video call-in television system includes a host automation module which assists the on-air talent in selection of caller video and audio from a multiplicity of callers available from the video call central processing units the video call central processing units. The caller has been previously cleared for air by the producer.

In another aspect, the host automation module automatically determines a next video shot or combination of shots based on a combination of video options available from the multiplicity of video call central processing units and on-air talent camera options, and sends a signal to the on-air talent to indicate the next video and/or audio source that will be on the air (e.g. caller, camera, still, recorded video, and/or audio), before the source being placed on the air by a video/audio switcher/mixer. The signal sent by the host automation module to the on-air talent can be a light signal, text message, or an icon message on a screen In another aspect, the host automation module automatically determines a next video shot or combination of shots based on a combination of video options available from the multiplicity of video call central processing units based on a shot rundown routine including shot sequence and timings in simple text language prepared by the producer.

In another aspect, the host automation module dynamically overrides the current sequence, and determines the next video shot or combination of shots based on the video options then available to it from the multiplicity of video call central processing units, based on a change selected by the on-air talent in real time.

In another aspect, the host automation module signals the on-air talent by a plurality of tones of status commands. The host automation module records available options and actions.

In another aspect, the host automation module includes at least one application programming interface for communication and modularity.

In another aspect, the on-air talent or producer is in a different location from the video call central processing units or the host automation module.

In another aspect, a plurality of separate audio tones of different frequencies is used to identify the video call central processing units.

In another aspect, a caller sees a return video in real time, and the return video can include a text overlay with information for the caller.

The term "television video" includes any form of video signal used within the technical aspects of traditional live television production, including analog, digital, component, composite, and SDI, including video signals of those types after conversion from computer based video outputs such as DVI, HDMI, and VGA, but excludes video processing within a conventional computer that produces normal computer video monitor outputs such as DVI, HDMI, and VGA. In the context of television video, the terms "convert", "converts", or "converting" video into television video are synonymous with the terms "generate", "generates", or "generating" television video.

The terms "a" and "an" are defined as one or more unless this disclosure explicitly requires otherwise.

The terms "comprise" (and any form of comprise, such as "comprises" and "comprising"), "have" (and any form of have, such as "has" and "having"), "include" and any form of include, such as "includes" and "including") and "contain" (and any form of contain, such as "contains" and "containing") are open-ended linking, verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Skype® is used as an example of an internet protocol video service, but other branded and generic IP video services and applications may be substituted.

Video Distributor can include entities which package and/or distribute audio, video, and/or multi-media content directly to consumers or indirectly as wholesalers, such distribution being via broadcast television, cable television, satellite television, telephone systems, data, IP video, the Internet, and any other form of distribution using wired or unwired means.

Other features and associated advantages will become apparent with reference to the following detailed description of specific embodiments in connection with the accompanying drawings.

DETAILED DESCRIPTION

A video call center process and system can create cost effective video programs for television transmission from a multiplicity of simultaneous video callers. Related Video Call Text Overlays can aid in tracking and identifying on air the multiplicity of simultaneous callers. The on-air talent can do the video mixing of selected callers with a touch screen. Related audio switching and conferencing of video callers can be done by a specialized switching control device.

The video call center process and system can efficiently permit development of call-in video programs that work with the low level economics available in relatively small-audiences available to today's fragmented video distribution. The production of live video call-in programs can operate with as few as two people, including a producer and on-air talent as seen in talk radio.

The producer screens and coordinates incoming separate internet video calls and inserts textual information (i.e.: "Bill, Chicago") into the computer video display for each call, thus providing the on-air talent with the information immediately necessary to put a video call on the air. In some embodiments, the text can be inserted before the computer video is converted to television video.

The on-an talent can physically select the calls that win be aired is a touch screen (and/or conference mixer controller) and specialized audio equipment. With the imbedded textual information in the picture, the on-air talent can, with no other information, tap the touch screen and smoothly transition to the new caller (i.e.: "Bill's up on the line now, Hi Bill, What's up in Chicago?")

Figure 1:
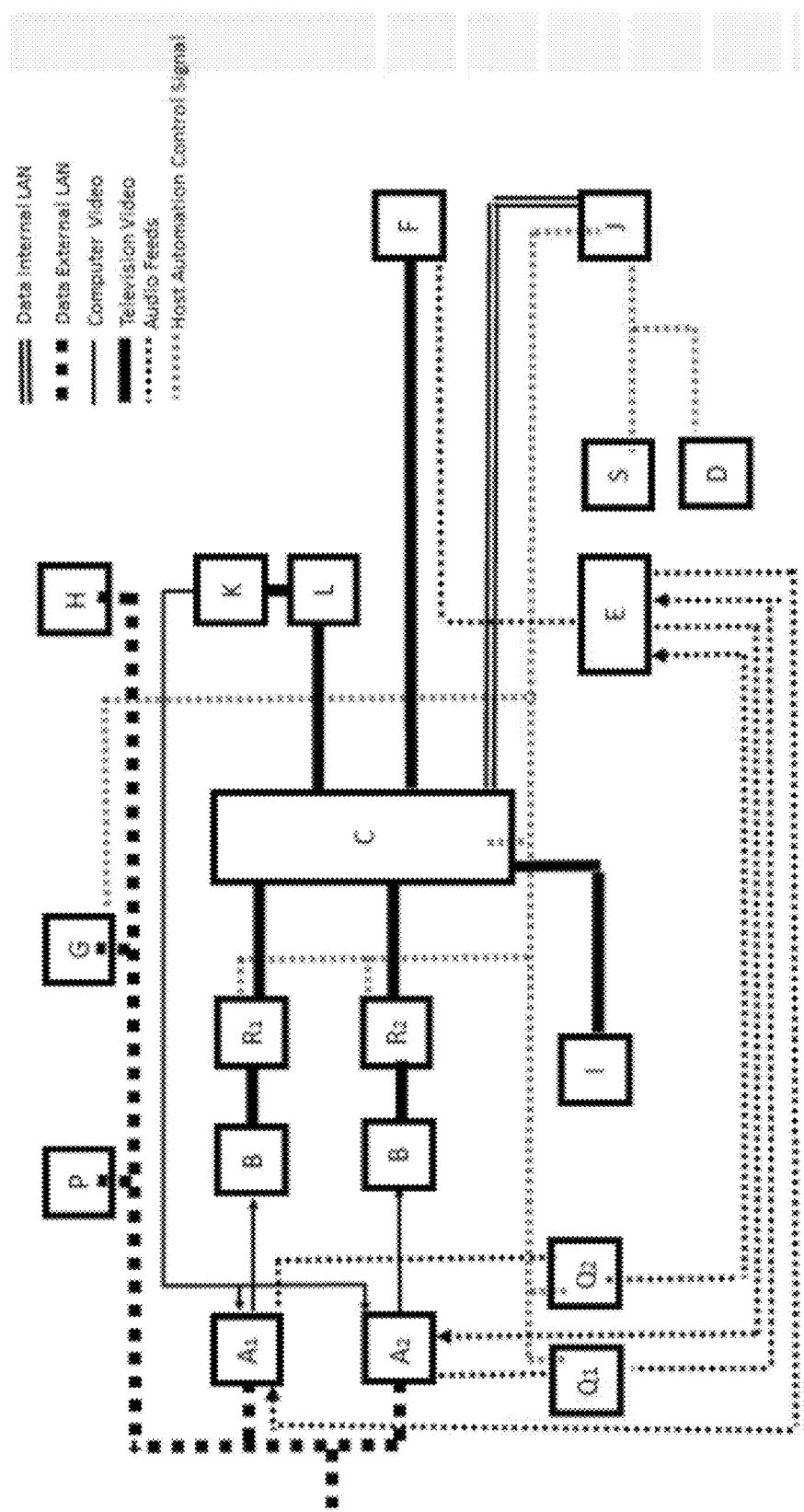
FIG. 1 is a schematic diagram depicting a video call center system.

The system can have a plurality of major components. As shown in FIG. 1, Block A can be two or more Video Call Central Processing Units (Video Call CPU) (hereinafter to include a virtual machine performing the necessary functions of the Video Call CPU) which can perform the following actions in real time for each video caller:

a) making or receiving the video call (with associated audio) via the interne, b) generating, selected text identifications or Video Call. Text Overlay for the caller (i.e.: Bill, Chicago) and positioning, such text over the call video from manual or automatic entry, c) selecting the video sizes and positions on the screen prior to the call video with text being converted to a video signal usable in live television production, d) collecting imbedded information about the video call and preparing such information for storage in a database with other call characteristics, e) preparing selected text identifications from b (above) for storage in a database with other call characteristics, f) permitting entry of producer notes in real time both in preparation for storage in a database and a separate display for talent, g) storing all information in a local database, h) communicating with and stores information in a database run through a different central processing unit, i) displaying information previously stored in a local or distant data base, j) returning audio to the caller, and k) returning video to the caller.

In some embodiments, a Call CPU performing the above-mentioned functions can be dedicated to each separate caller that is on-air or is being prepared for air. The number of Call CPUs is variable depending on the number of calls that are desired to be in the screening process and standing by in queue for a particular on-air application.

Block B is a Television Video Converter which takes a selected portion of the video through the standard computer video output (such as DVI or VGA) of the CPU/Block A (including the Call Text Overlay) and converts the video into a television video signal usable by normal television production equipment, such as video via a Serial Digital Interface (SDI). The Video Converter may be a stand-alone device, or be included within the container of the Video Call CPU as an additional process or board. In the preferred embodiment, a Television Video Converter will be dedicated to each CPU, however various video call feeds may be preselected through sub-switches for processing by a single Television Video Converter. This will limit the number of call options available to the on-air talent, but will reduce the number of Television Video Converters necessary.

Block C is a television video mixing apparatus which permits selection of various television pictures from the multiplicity of Call CPUs and related Television Video Converter sources, or from other video sources necessary to production. The video output of Block C goes to Block F for preparation for transmission and also returns directly to each Video Call CPU (after being converted back into video format acceptable to computers) or by way of a text generation system (Block L) to provide to the caller both the picture currently on the air plus textual information to the caller.

Block D is a Touch Screen Display selection apparatus used by the on-air talent to select the next caller to air from the multiplicity of callers provided through Blocks A and B as made available through Block C directly or via the scripting system of the Host Automation Module (Block S) and related video and/or audio relays (Blocks $R_1$, $R_2$, $Q_1$ and $Q_2$). The video in the multiple boxes in the touch screen are from each awaiting caller, and each such caller's video contains the Call Text Overlay identifier (Bill, Chicago) from Block A(c).

Block F is a specialized audio mixer capable of providing discrete audio returns to each Video Call CPU (and thence to the individual caller) so that all callers can hear each other and the talent, but not themselves. This is necessary due to the various processing and transmission delays in internet video calling which could result in a significant, and very confusing, delay in the caller's voice returning to him/her. Such discrete return audio feeds are known in the trade as an audio matrix or "mixed minus."

Block F is the encoding process/unit to prepare the final audio and video signal for transmission live to a video distributor. In an alternative embodiment, Block F is incorporated at the output stage of a video mixing device, Block C.

Video distributor can include entities which package and/or distribute audio, video, and/or multi-media content directly to consumers or indirectly as wholesalers, such distribution being via broadcast television, cable television, satellite television, telephone systems, data, IP video, the internet, and any other form of distribution using wired or unwired means.

Block G is a separate CPU for the Video Call Database, optional Producer Central Control to the Video Call CPUs, and communication point between the Call CPUs and the Host Automation Module (Block S) for the purpose of indicating to the Host Automation Module calls that have been cleared by the Producer.

Block is the Information Screen for the Talent containing text messages from the producer regarding topics or characteristics of the callers and other information necessary for coordinating a television program. Such messages may also incorporate caller information retrieved from the Video Call Database, Block G.

Block I is one or more video cameras photographing the on-air talent, or other video sources related to the program then being produced.

Block $R_1$ and $R_2$ are Video Relay switches that blocks the incoming call video until the call is cleared by the Producer and the Relay is closed to permit the video to pass.

Block $Q_1$ and $Q_2$ are Audio Relay switches that blocks the incoming call audio until the call is cleared by the Producer and the Relay is closed to permit the audio to pass.

Block J is a specialized, ergonomically designed conference mixer-controller that permits the talent to add audio and/or video of multiple callers when desired, restore the audio system to a single caller as needed, or stop all the caller video and audio if necessary. The conference mixer-controller can also handle both audio and video. Block E can have a series of relays before the audio mixer to control on and off of the audio (Blocks $Q_1$ and $Q_2$) and/or video (Blocks $R_1$ and $R_2$) signals. In some embodiments, by sending an audio control signal, the on-air talent's controller (Block J) can be designed to drive the series of relays (via various scripts on a Host Automation Tool Module (Block S) (HAT)) that open or break the audio and/or video prior to the audio mixer. The control signals that relays receive can be serial/RS232 or USB control data from the Host Automation Tool Module (HAT). Thus, the switching the audio on and off can be done before the mixer.

Block K converts Television Video output of Block C, the video mixer into video that can be processed by a computer.

Block L generates and adds text message overlays to the video from Block K to be returned to all Video Call CPUs and hence as return-video to the caller. In some embodiments, a process for the video return to the caller can include converting the television video to analog, inserting the text, and converting the combined image to computer video for return transmission to the callers.

Block P is the Producer Control Point which includes the ability to monitor and control video calls on the Video Call CPUs either directly, or via an optional control CPU, including the entry of Caller Text Overlays and continuous video monitoring of video output (including Caller Text Overlay) from the Video Call CPU or from the Television Video Converter if it is dedicated to each Video Call CPU. Incoming audio is monitored and return audio can be interrupted by the producer to communicate with each caller.

Figure 2:
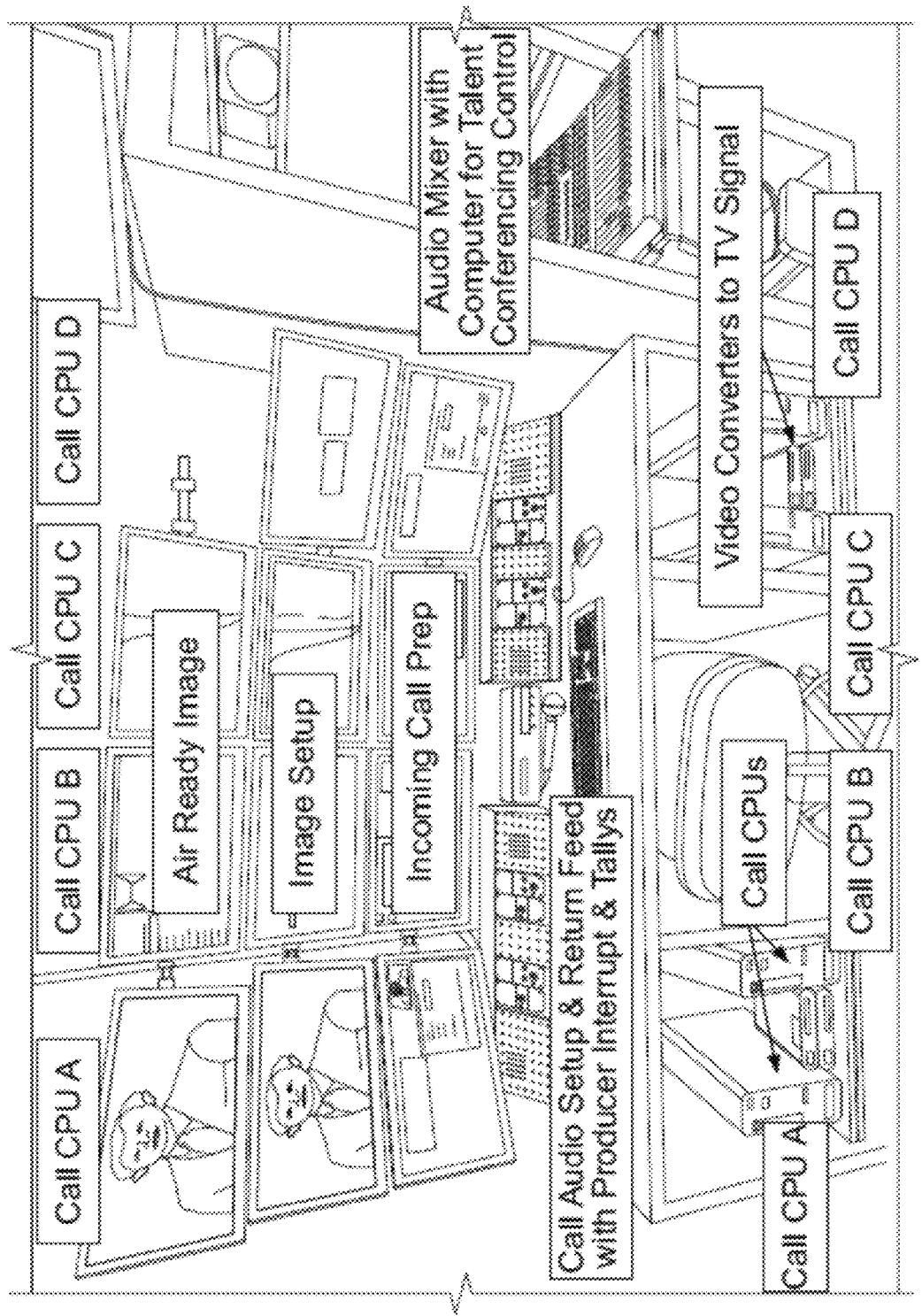
FIG. 2 is a figure depicting a video call center system.

An embodiment of an installed video call center system is shown in FIG. 2.

As shown in FIG. 1, when on the air, the TV Video Call System is intended to be operated by two people: a producer and the on-camera talent, with additional producers as necessitated by caller load or program complexity. The producer at Block P, the Producer Control Point (shown in FIG. 3), screens incoming calls, decides on and enters the Caller Text Overlay (Bill, Chicago), and enters topics and other notes for the talent to see on the display shown in Block H. Incoming audio from computer can be amplified. Producer uses "monitor" side of a switch to listen to caller when establishing call & text overlay. The producer can switch to "Air" when ready. In some embodiments, the hardware switch may be replaced by a software "GO" switch within the Call CPU which messages the Host Automation Module (S) that a call has been "cleared", the Host Automation Module then closing the appropriate audio and video relays to make the call available to the Host and video mixer.

Figure 4:
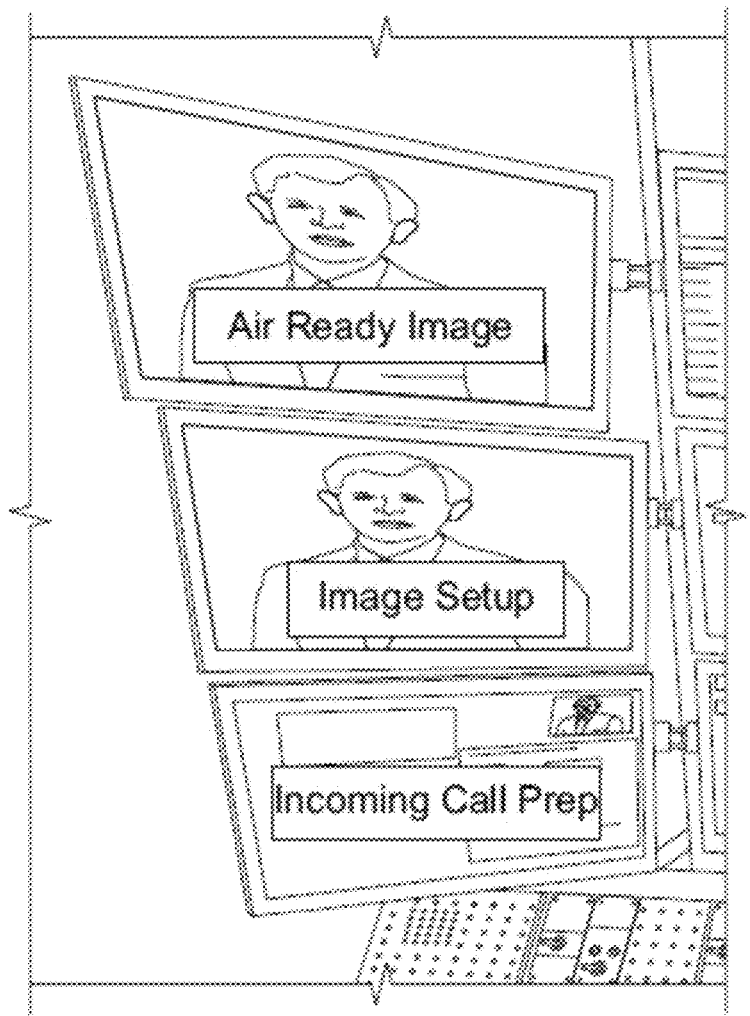
FIG. 4 is a figure depicting a video call center system.

In some embodiments, as shown in FIG. 4, the process can be:

1) when call is received, the producer enters city and caller name in the text entry box. The producer can also include topic, or any other relevant info that fits ("Incoming Call Prep" in FIG.
2) Caller info is immediately displayed in a predetermined, position and font (with drop shadow option) on the incoming caller picture ("Image Setup" in FIG. 4).
3) Picture is cropped and converted to Television Video. With Caller Info always part of the picture, any question of which caller is can be eliminated in a fast paced show. Further, supporting staff to assure subsequent accurate entry to talent and text is unnecessary. (FIG. 4 "Air Ready image")

Figure 3:
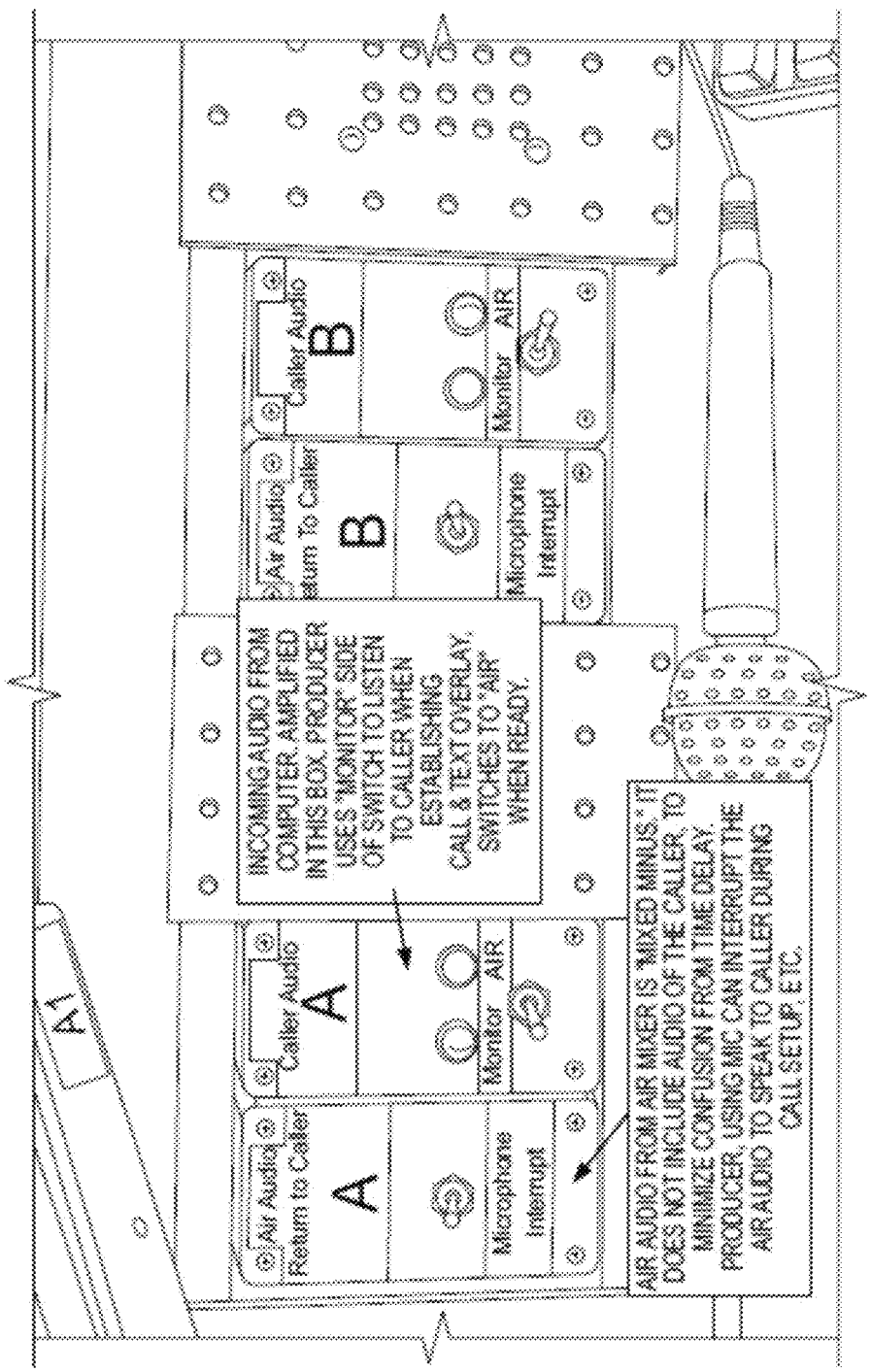
FIG. 3 is a figure depicting a video call center system.
Figure 5:
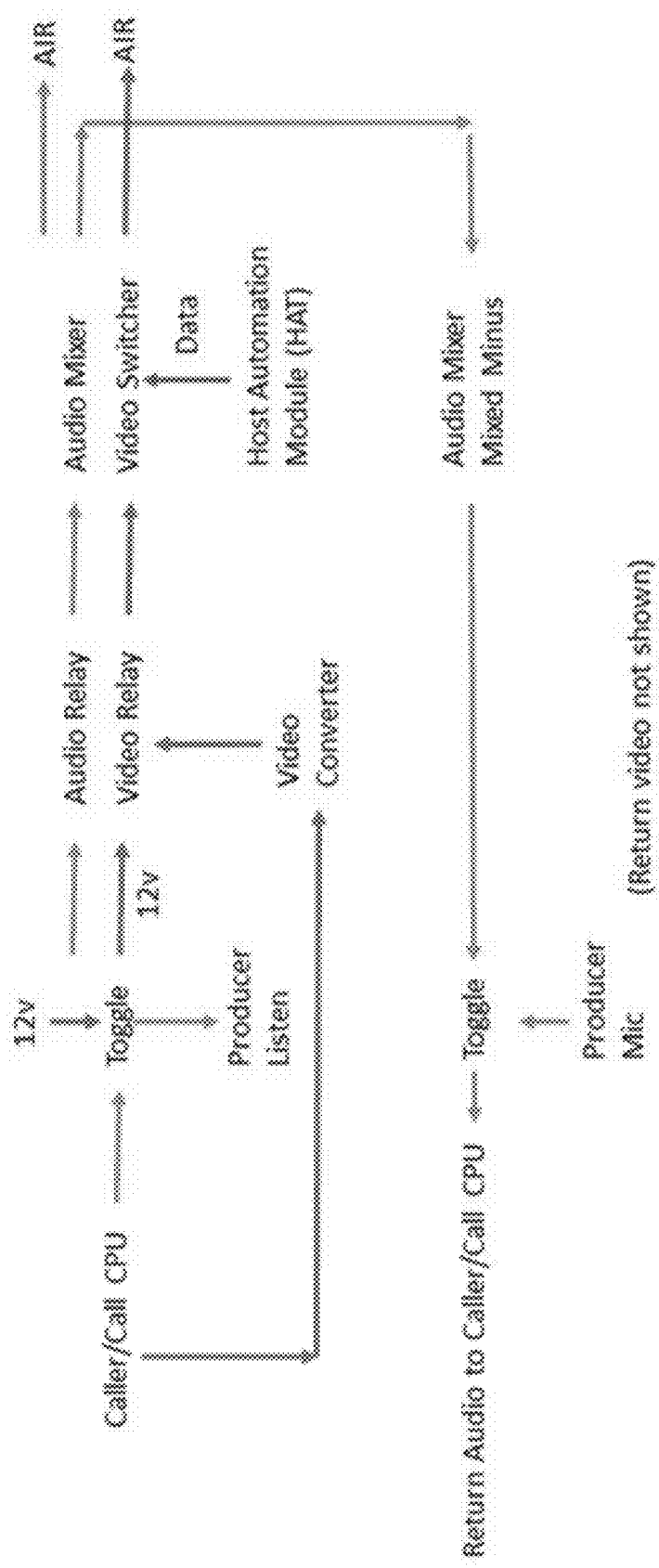
FIG. 5 is a schematic diagram depicting a video call center system.

FIGS. 2-4 reflect a configuration shown in FIG. 5. The incoming video/audio signal is directed to a toggle switch. The audio signal is then directed to audio relay and audio mixer to be aired. FIG. 5 also shows the return audio signal. Likewise, the video signal is directed to audio relay and audio mixer to be aired. Return video signal is directed by the system to call CPU as well (not shown in FIG. 5).

Figure 11:
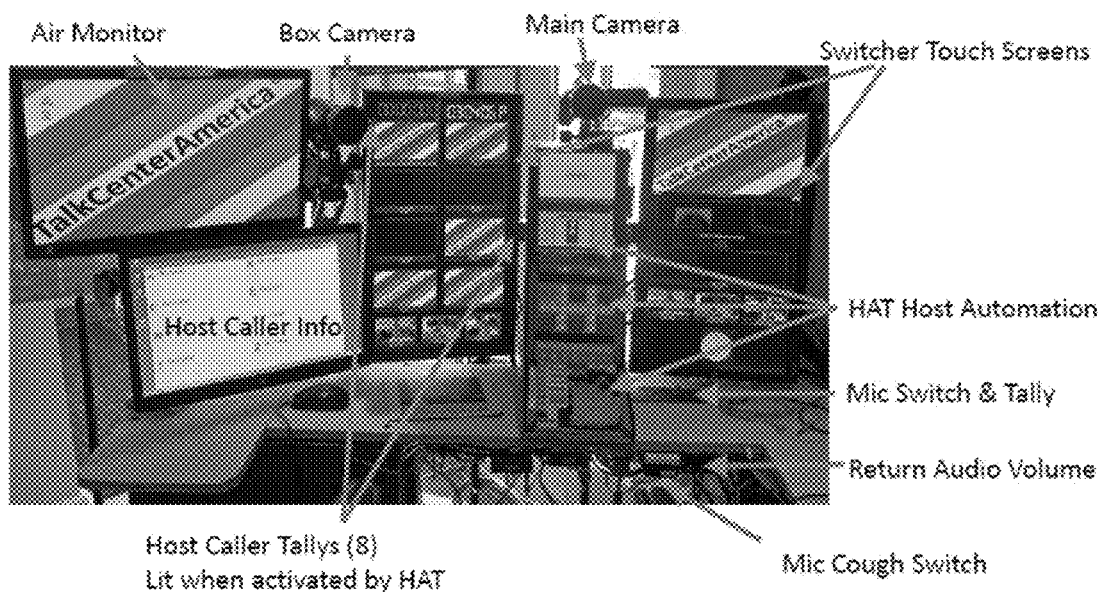
FIG. 11 is a figure depicting a video call center system.

As shown in FIG. 11, the on-air talent sees the pictures of available callers and Video Caller Text Overlay on his/her touch screen, and selects the next desired video caller for air by tapping the picture of the desired caller. That caller is now on the air. By selecting video and/or audio from additional callers through Block J, the specialized audio conference mixer-controller, the on-air talent can allow multiple separate callers to participate in a conversation on air, while the on-air talent independently selects from the multiplicity of video pictures of the participating callers. The on-air talent neutralizes the conference when ready to move on to the next video caller. In addition to selection pictures via the touch screen, the talent selection of video pictures can be partially automated through a combination of audio-follow video and voice activated switching methods as allowed by the relays within Block E.

When a video call is received at the Video Call CPU, the Producer in contact with the caller, enters text for the Caller Text Overlay in one part of the screen, such text displaying in a predetermined position over the video caller in the video caller part of the screen(s) of the Video Call CPU. Such text may be entered in an on-screen box specifically designed for the purpose, or entered into a data-base form. In either case, the text appears both in the box/form as it is entered, and over the video of the caller. Caller ID information is extracted from the available call data and is shown on the Producers control screen as a cell in a database window. Additional pertinent information regarding the caller, legal releases, may be entered by the Producer into a data base form. Topic information and notes for the on-air talent are also entered into the data base form, but such information for the talent is immediately transmitted to the talent's information screen, (H). Caller ID information automatically activates a search of the central data base (G), and any information located is returned to the data base form at the Video Call CPU for use by the Producer in the call screening process. New information entered into the database form at the Video Call CPU is saved into the central database when the call is terminated. Additional pertinent program details such as date, time of air, show name, talent, producer are entered at login and retained within each database entry.

The Video Call Text Overlay eliminates the need for a traditional character generator operator and associated production assistants, while assuring that there is no mix-up in who is calling during a fast paced show. Traditionally, television text is inserted during or after the switching process of the television-type video, which requires coordination between the incoming call and the name attached to the call. In the current embodiment, the text is inserted within the computer handing the incoming call and before the computer video is converted to television video. This assures that the text stays with the caller's picture throughout the process.

The use of the touch-screen caller selection by the on-air talent eliminates the need for a technical director who normally switches pictures of talent in remote video, while letting the on-air talent control the content flow of the program through video touch screen and through the customized audio conferencing unit.

The conference mixer-controller (Block J in FIG. 1) be ergonomically designed. It can allow the on-air talent to control on-off video and/or audio for each caller without looking, down from camera, while reducing potential for hitting the wrong button.

Figure 6:
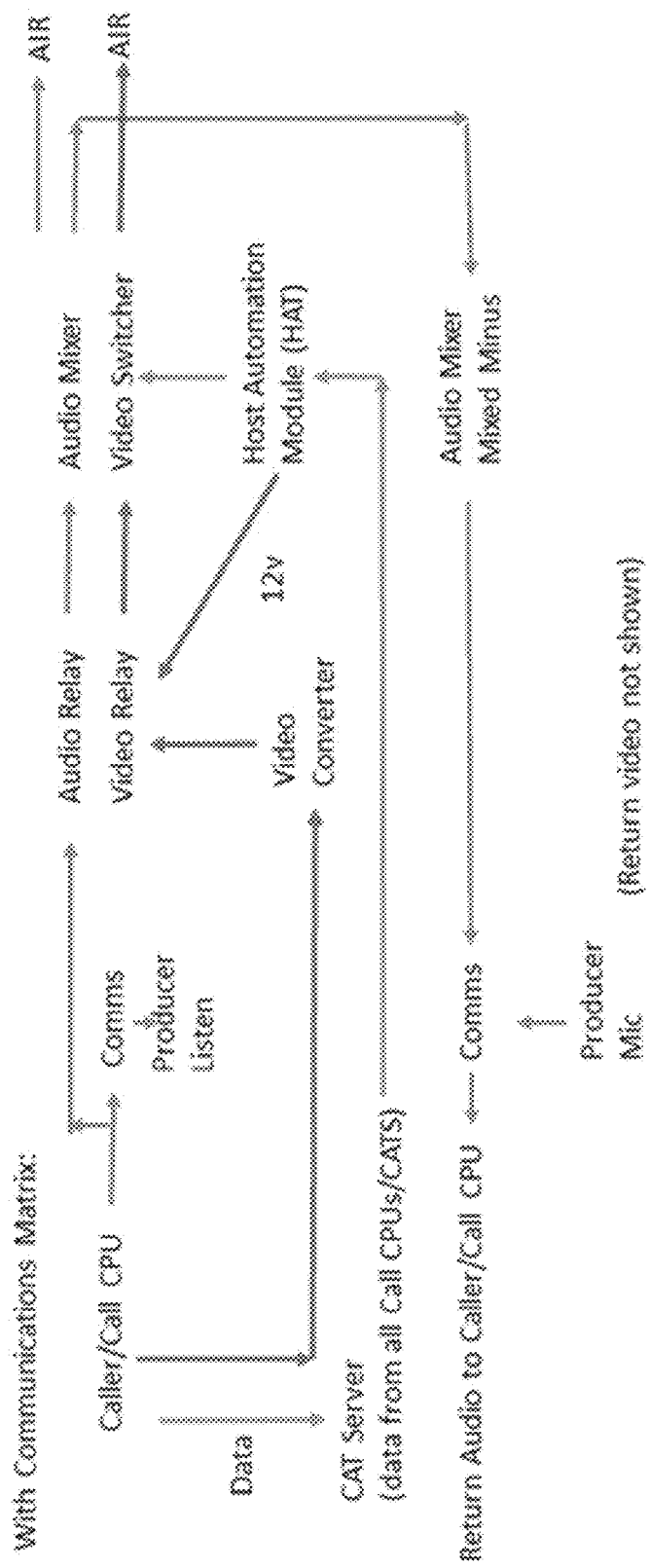
FIG. 6 is a schematic diagram depicting a video call center system

In some embodiments, the producer-caller communication ma be via a communications matrix as shown in FIG. 6. Caller Acquisition Tool (CAT) is included to streamline the process of logging and retrieving caller data and presenting it to the call screeners, production staff. Toggle switches can be replaced by a professional communications matrix (ClearCom or Comms in FIG. 6) and soft-keys an the CAT running on the Call CPUs, via a server. The call producer can clear a call by clicking GO on the CAT screen, which will send a serial message to the HAT via the CAT server. The HAT will send a message to close the appropriate video relay, making the call available to the host and switcher. Currently the relay is closed when the producer switches the toggle to air (also see FIGS. 13-22). Likewise, the audio signal is also directed to audio relay and audio mixer to be aired. FIG. 6 also shows the return audio signal. Return video signal is directed by the system to call CPU as well (not shown in FIG. 6).

Figure 7:
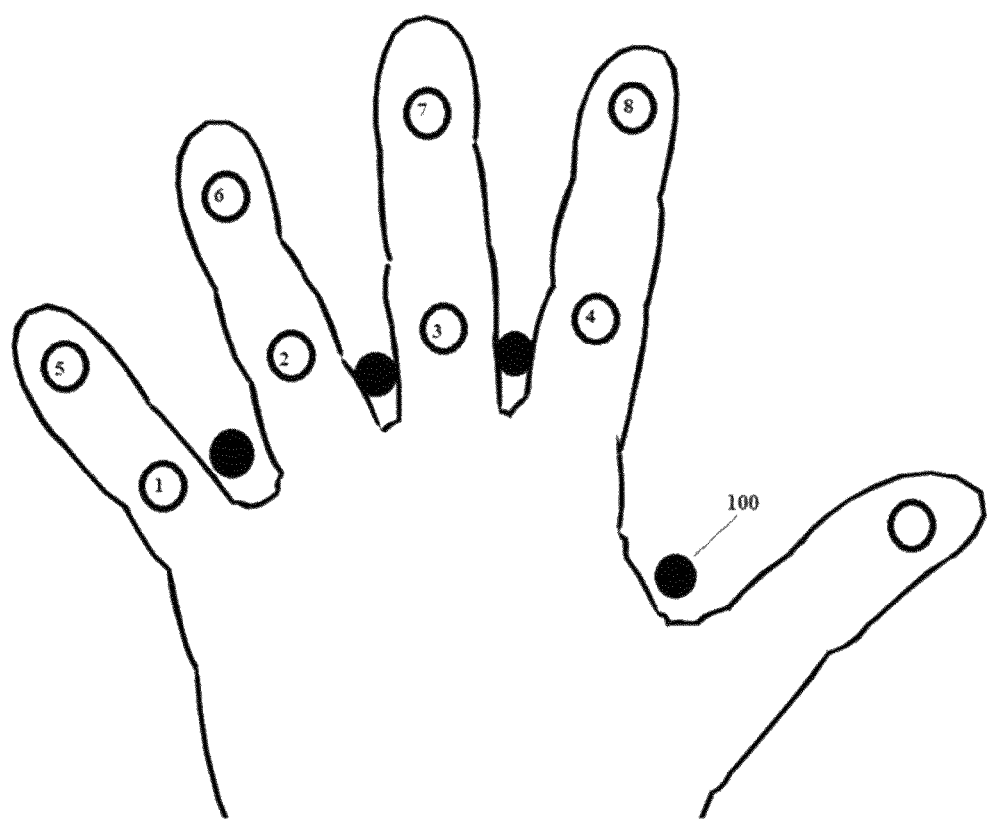
FIG. 7 is a schematic diagram depicting a video call center system.

As shown in FIG. 7, keys/buttons can be custom positioned on a commercially available flexible input system that has been modified for comfortable hand position to create an ergonomically designed conference controller pad. It can contain a series of switches or switch controls arranged under the fingers of either or both hands, so as the pressing of several selected switches will result in the video and/or audio associated with those switches being placed on air individually or in conference. It can have pins 100 between each finger so that the ergonomic design of the switching unit can prevent errors when then hand is placed into the unit while the on-air talent is on air. In other embodiments, as shown in FIG. 6, bridge 200 and/or raised bumps between active keys can be used as a replacement of pins to provide a tactile warning to assure accurate position of index and middle fingers.

Secondary hardware or software latches and releases via foot pedals and/or under the thumb (shown in FIG. 9) can used to insure that the intended video and/or audio switches being added without error, and permit clearing of all non-desired video and/or audio. As further shown in FIGS. 7-9, a partial sphere shape (300 in FIG. 8) and a molded negative palm cast (400 in FIG. 9) can be used, separately or in combination to support and assure proper placement of the hand.

Figure 8:
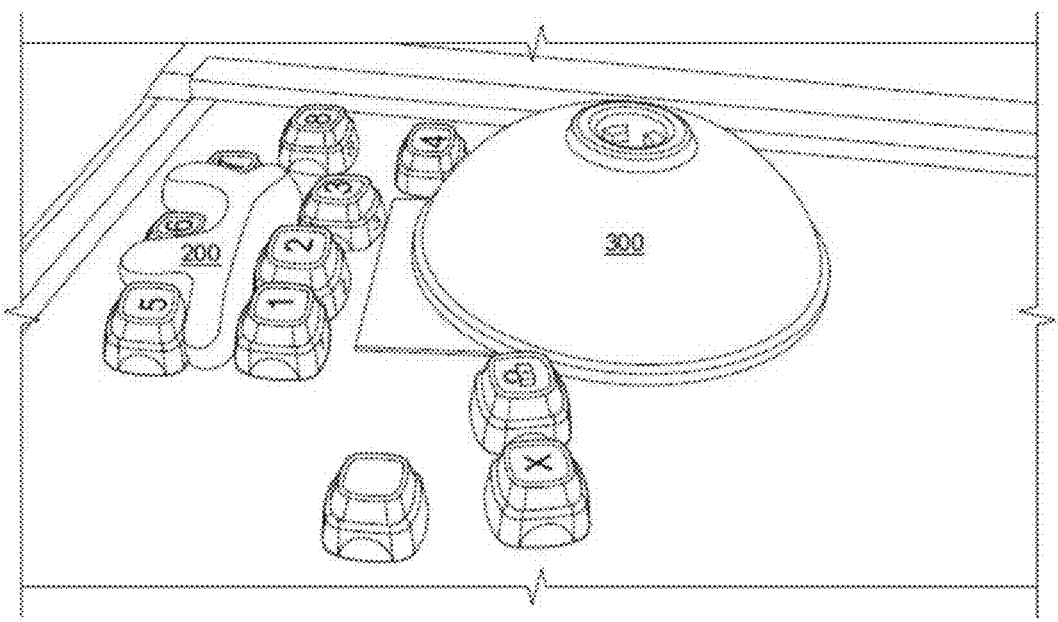
FIG. 8 is a figure depicting a video call center system.
Figure 9:
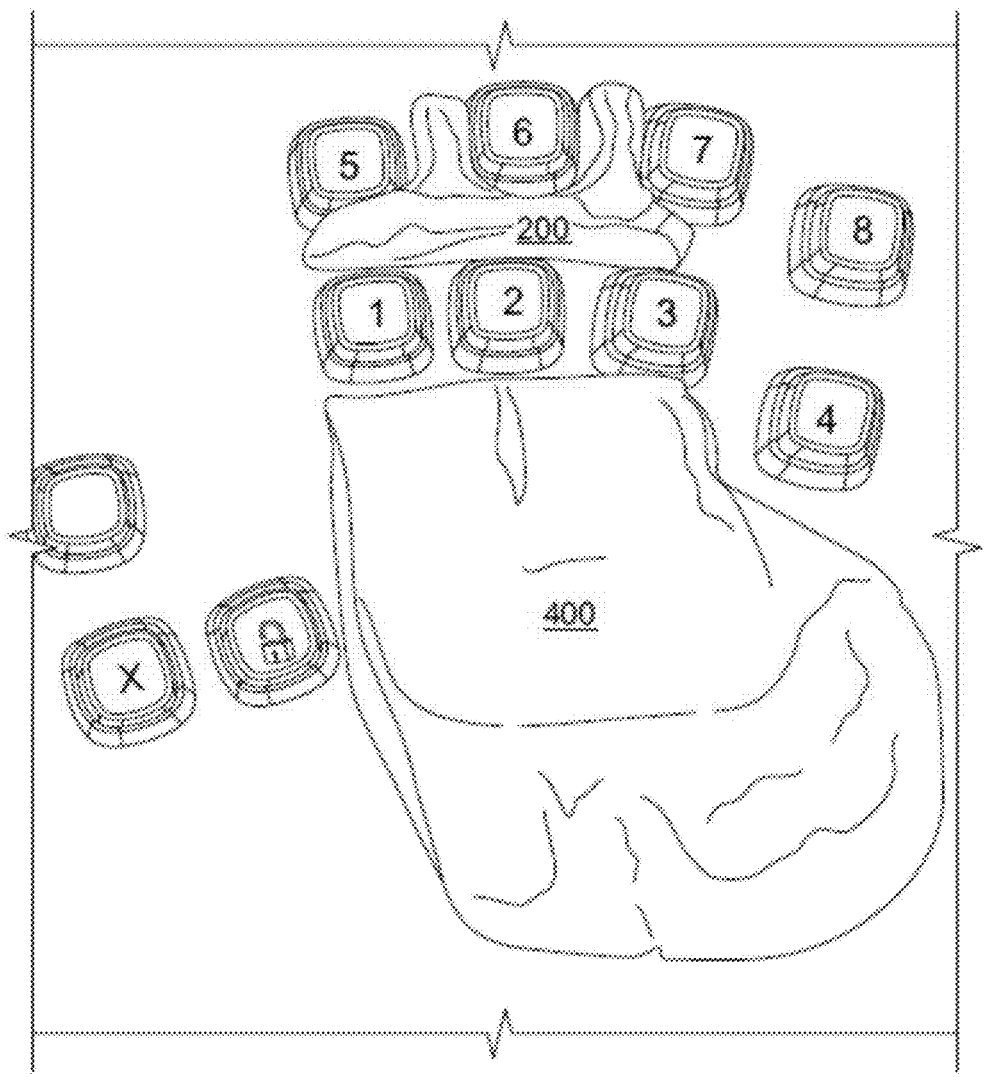
FIG. 9 is a figure depicting a video call center system.
Figure 10:
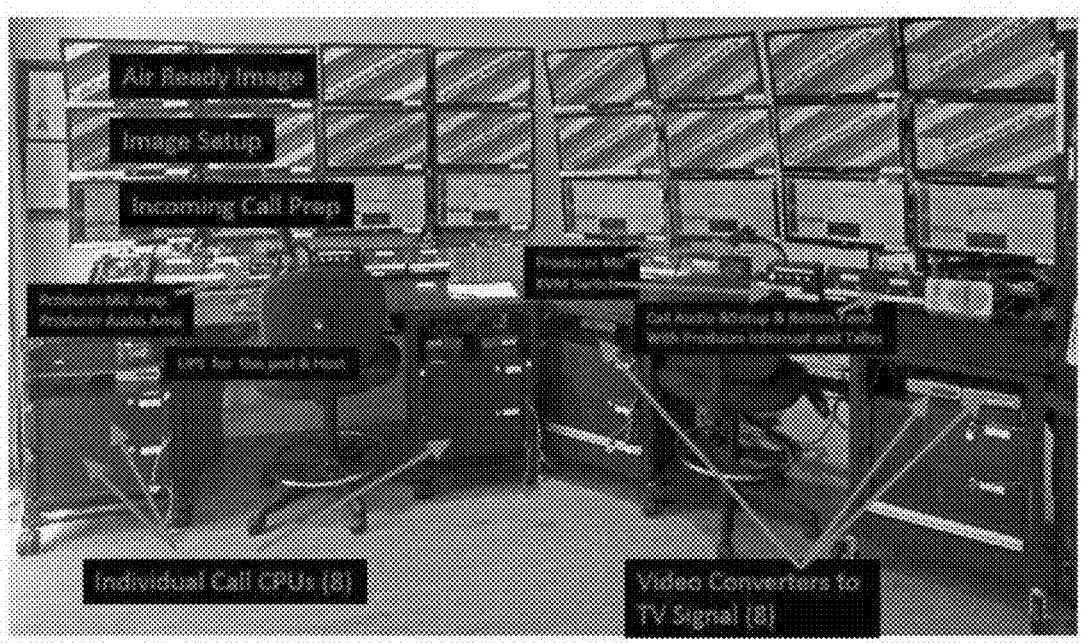
FIG. 10 is a figure depicting a video call center system.

In some embodiments, the conference controller pad can handle a selection of individual inbound callers, such as caller A, caller B, caller C, caller D, caller E, caller F, etc. The selection can include any inbound caller and the number of selected callers can be one, two, three or any number the on-air talent wants. In some embodiments, the conference controller pad and associated software can be modified to let the on-air talent put two or more callers on the air at the same time. In some embodiments, the conference controller pad and associated software can enable the on-air talent put multiple callers on the air at the same time, while the rest of selected callers stand by. As shown in FIGS. 8-10, the on-air picture shows the on-air talent plus a primary or featured caller who may stay on through a number of calls, and then a third picture of the current caller, or, in the alternative, just the featured caller and the current caller. This allows the easy incorporation of, for example, a government official or an author as a featured guest calling in, and then lets other callers appear with that featured guest.

The conference controller pad has multiple primary buttons under the palm shape for easy location. As shown in FIGS. 7-9, eight buttons can be labeled A-D and W-Z to control the audio and video from the call CPUs of the same name. The caller can connect from any device with suitable video/audio input and transmission functions, for example, a computer, tablet, smart phone or other mobile device. The button can be in same color, e.g. green. In addition there can be eight other buttons of different color, e.g. yellow, labeled in the same way. When a single primary button is pushed and released, the caller associated with that call computer is sent to air. In order to put two callers up at the same time, the secondary caller (yellow) button is pressed and held down, then the primary caller button (green) is pressed and held down, and when both are released, the combination key selection triggers the appropriate software to open the audio relays and begin the video switching process predetermined for that combination. In some embodiments, once an initial caller sequence is started, the air talent can use a second key which, when held down in conjunction with another caller's key, will add that caller to the airing sequence, or, conversely, subtract a caller from the sequence. When this occurs, the sequence changes (defaults) to the sequence appropriate to the new number of callers In some embodiments, the trigger actually occurs on the release of the key/button. This allows the on-air talent, during a live show, to prepare to take the next caller by putting his/her fingers on the appropriate keys, and then waiting for the right moment to cause the next event to occur. There can be at least one additional button/key. It can stop the caller's audio and video and immediately returns the video signal to the host. This button/key can be used to end calls.

The TV Video Call System requires a multiplicity of callers connected to a multiplicity of call CPUs or virtual equivalent. As the result, the system receives a multiplicity of separate audio and video signals from those caller devices through the call CPUs. Since the broader process separates the audio from the video for processing, call selection and switching/mixing, the use of this multiplicity of nearly identical inbound signals through a multiplicity of nearly identical caller CPUs or virtual machine equivalent makes the identification of any individual inbound audio signal difficult during the system setup, testing, and management phases of operations. Traditionally, a standard 1000 Hz tone has been used to identify and adjust the audio portion of a television signal. However, in this case, the multiplicity of similar signals can all carry the same 1000 Hz tones, resulting in confusion and delay in identifying the signals. Therefore, it can be particularly difficult to build and test a composite end audio/video product composed of two or more incoming signals because the sameness of tone makes it impossible to distinguish two actually different audio signals.

The solution is to provide a tone of a different frequency for identification of each call CPU, thus allowing creation of an easily distinguishable chord when the signals are combined or a differentiated tone when a single signal is being identified. Such differing tones can be generated in real time within the call CPU, generated through playback from a previously recorded file stored within the call CPU, generated through a signal generated in a test computer that is originating (sending) a call received by a call CPU, or generated by playback of a downloaded application within a test or consumer computer that is making the inbound call.

Additionally, tones of a certain nature can be used to identify a specific group or bank of call CPUs. In some embodiments, groups of four computers can be clustered together under the control of one call producer/screener. All tones of one group of four call computers are of frequencies normally associated with the "white keys" on a piano—for example, A, C, E, G, while as second "bank" of call computers is identified by "black key" frequencies, A#, C#, F#, G#. This results in an immediate audio dissonance should the banks be combined when testing require they be kept separate.

As shown in FIG. 10, the TV Video Call System can have multiple screens for displaying the air ready image, image setup and incoming call preparation.

Figure 12:
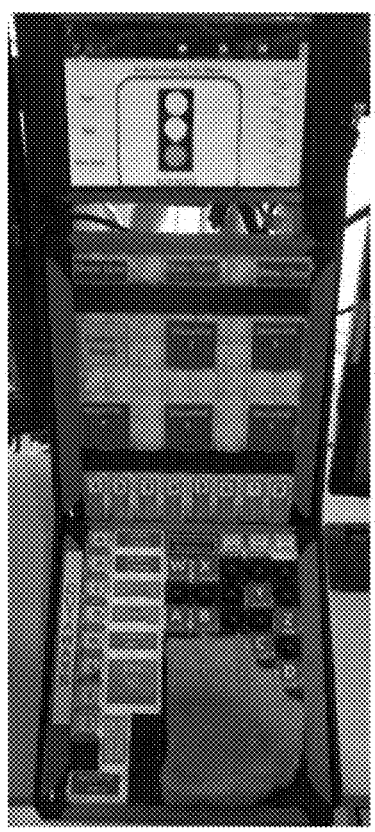
FIG. 12 is a figure depicting a video call center system.

FIG. 11 shows the control and display setup for the air talent. On the right side, Host Automation Tool (HAT) is positioned adjacent to the ergonomically designed conference controller. FIG. 12 shows the status screen, content control pad, and ergonomically designed conference controller (from top to bottom).

In some embodiments, Caller Acquisition Tool (CAT) is designed to streamline the process of logging and retrieving, caller data and presenting it to the call screeners, production staff. The CAT can also parse and overlay key information about the caller into the video stream, which is carried to both the host's workstation and the outbound video. Additionally, CAT allows for single-click management of a variety of common troubleshooting and initialization steps developed over the last year of development and testing. While the software titled CAT performs the majority of these functions, the actual CAT solution is a combination of hardware and software.

In some embodiments, custom-built Windows 7 Professional desktop Video Call CPU computer (alternatively referred to as the CAT computers) are connected via workgroup sharing to an Advantech Windows 7 computer (the Server) running Access Database connectivity software and hosting the caller database. CAT software, AutoHotKey automation scripts, batch files, and a variety of installation utilities in the event that CAT units need to be reimaged or otherwise reconfigured.

The CAT computers and Server can be networked in a certain IP address range, which adds a layer of separation between them and other networked devices within the studio. Additionally, they are configured with the same workgroup.

On first startup of the CAT computers, a batch file runs to ensure connectivity to the Server, and maps two network drives which reside on the Server. The first drive contains all software related to CAT functionality within its various subfolders. The other drive is called the "Air Pics" folder. This folder can be utilized by a producer to preload graphics for use during a show.

In some embodiments, in the event CAT computers are unable to access the server or mapped drives and the issue is determined to be outside of that specific unit, an administrator can log in to the Server via direct access and run a batch file solution to reset workgroup sharing on the server.

When the CAT software opens, two positioning scripts are run to ensure the main CAT screen, the Text Overlay, a voice-over-IP (VoIP) application (e.g. Skype®) and it's video preview are positioned properly, in addition to a third-party audio monitoring program.

After initialization is complete, the user must select the show format from a dropdown list (which retrieves show metadata set at the Producer level such as show topic, host name, and date, in addition to some formatting configurations for the font face, color, and size the Text Overlay will use) and enter their name and lock this data to continue. Only after this is done will the Caller Information panel become available so calls can be logged. If there is a changing of the guard or a different show format is coming on, the user can unlock this data, update their selected show, and re-lock. The show metadata and screener name are automatically logged alongside caller data.

In some embodiments, the CAT software can pull the scheduled caller list based on the selected show metadata and not list callers who have been established for other shows or formats.

The process of logging a call can be divided into four steps, performed sequentially for the most part:

READY—Clears out any entered data. It can restore the Text Overlay to the HOME position (top left). When in the READY state, the caller information panel is GREEN. Once READY has been selected, scheduled callers can be selected from a dropdown list or searched for via Skype® account name or email address. Either of those options will fill in whatever information we have previously logged about the caller aside from the topic they are discussing, speeding up the process significantly. These options are mutually exclusive: Selecting a caller from the scheduled list prevents searching, via account data, and vice-versa. This is primarily to avoid database connectivity hang-ups, SET—Checks to ensure all required data fields are filled in, and presents a specified error if any are not. If all required conditions are met, the caller data is logged to the database along with the show metadata and current time. The Text Overlay is updated with the caller's name (which can be abbreviated via a checkbox) and Location or Topic (selected via a radio button next to either field). At this point the host's terminal will still show "NO CALLER" on the line pertaining to the CAT computer in use, as all screening and readiness requirements may not have been confirmed yet. In this state, the Caller Information panel turns YELLOW EDIT—Hides the Text Overlay temporarily and allows the user to make alterations to caller data, updates the entry in the database and restores the Text Overlay. Caller information panel turns ORANGE in this state.

GO/STOP—Multiple functions:

GO: Updates the database entry for the current caller and flags them as Air Ready. Additionally starts a stopwatch which calculates the age of the call and updates the database every 5 minutes. When set as Air Ready, the caller is listed on the host's terminal, displaying their Name, Location, and Topic. Based on call age for two importance flags set at the Producer level), certain color coding options are set at the host terminal level so the show talent knows who is a priority and who has been waiting longest to talk. Call screeners are still able to EDIT at this point. The Caller Information panel is RED at this point. In one embodiment, the GO command is communicated to the audio control/host automation control computer which uses such information to determine whether a call has been cleared for air prior to allowing it to be switched onto the air.

STOP: Indicates the caller is done. At this stage, the current time is logged as the End Call entry in the database, and the Air Ready flag is removed. An optional caller notes field is available; these notes will be presented to a call screener the next time they search for a caller's Skype® account or email address, to ensure no abusive callers are allowed to return on air. Once notes are entered or skipped, the Caller Information panel returns to its default color.

In some embodiments, there can be an Active Caller list which displays all the same information as the host's terminal. In particular if the Producer has set a caller as the Next Caller, their name will be highlighted in BLUE. An attentive screener will be able to inform that specific caller to prepare!

By clicking, any of the six Text Overlay positioning buttons (Top Left being marked "HOME"), the caller's Name and Location or Topic can be displayed over their Skype® image in a variety of positions.

The vertical position of the Text Overlay is adjusted via calling either OVERLAYT.EXE (top) or OVERLAY-B.EXE (bottom). Pressing the button marked "TEXT TO HOME" restores the overlay to the Top Left position.

The horizontal orientation is then altered by modifying the graphical text on the Text Overlay to Left Align, Center, or Right Align.

The text can also be hidden (which is done by default when editing a caller's data), useful for when a CAT computer is being used for media instead of a caller, Fine-tuning the Text Overlay positioning can be achieved by pressing the "UNLOCK TEXT" button, which makes four white dots visible around the border of the Window, allowing the user to drag the window wherever they like. If "LOCK TEXT" is pressed, it will hide those dots and prevent the user from moving the text accidentally.

Functions designed to speed up troubleshooting, quick-fixes to common problems encountered over the last year of development, or unit isolation if required, Reset Video Converting Application: Kills and restores Video Convening software to its default screen size and position.

Reset Skype® (or an alternative Video/Voice over IF service): Properly shuts down Skype® if possible, then funs a taskkill command on it if not, then restores the program before calling the proper positioning, script.

Reset Audio Meter: Kills and restores the audio level meter program before calling the proper positioning script.

Turn Skype® Off/On: Runs a batch file which modifies Windows Firewall entries as they pertain to Skype® and disables or enables the program's ability to connect depending on selection. This is typically used for isolating units during pre-show test phases, Turn Internet Off/On: Runs a batch file which modifies Windows Firewall entries as they pertain to all interact connectivity aside from TeamViewer remote access software, depending on selection. Additionally, this does the same for Skype® as an added level of isolation. This is typically used in the event a CAT computer is having unresolvable issues and would make it less frustrating for callers to be picked up on a defective screener unit.

Turn Audio ID Off/On: Depending on selection, plays or stops a WAV file with the specific CAT computer ID. This button flashes red and pink when the audio file is running, to alert the user in the event they cannot hear it happening.

In some embodiments, on the producer's workstation, there is a program which:

Lists all active callers and allows the user to set or clear priority flags beyond the call age, to indicate visually to the host which caller is the next in sequence or is important.

Allows the Producer to send a short text message to a small screen at the host position, to inform of important actions to.

Configure show metadata for topics or formats, and globally establish font face, size, and color for the CAT computer Text Overlay, Enter data pertaining to scheduled callers for specific shows or formats.

Clear all Air Ready flags to give the host a clean state. Note that this does not STOP a call on any of the CAT computers.

At the air talent's terminal there may be one or more screens to assist in communications with the producer(s). In one embodiment, two screens can be used to provide detailed information on callers and important messages to the host. Such screens may be directly connected to a server, or via one or more separate CPUs via LAN.

On the large screen, Host Viewer should be displayed, which is the grid-based list of all available callers, their locations and topics, presented according to a color-coded scheme set by call age or Producer-level priority flags, On the small screen, Emergency Messenger should be displayed, which shows the 70-character text message from the Producer mentioned above.

FIGS. 13-22 show one embodiment of the CAT screen and control setup.

Figure 13:
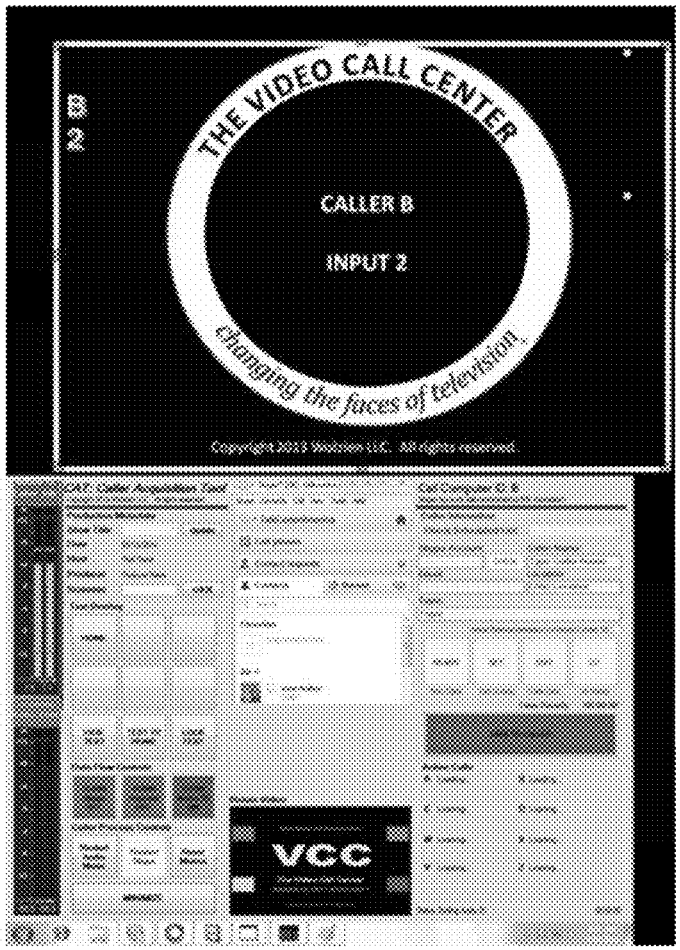
FIG. 13 is a figure depicting a video call center system.

In FIG. 13, the producer works with two screens for each caller. The top screen is to position the text overlay with caller info and for video setup, when needed. The bottom screen is for preparation of the metadata and monitoring of the audio and video returning to the caller. In some embodiments, there can be a third screen to check the cropped video picture going to the Host and video switcher.

Figure 14:
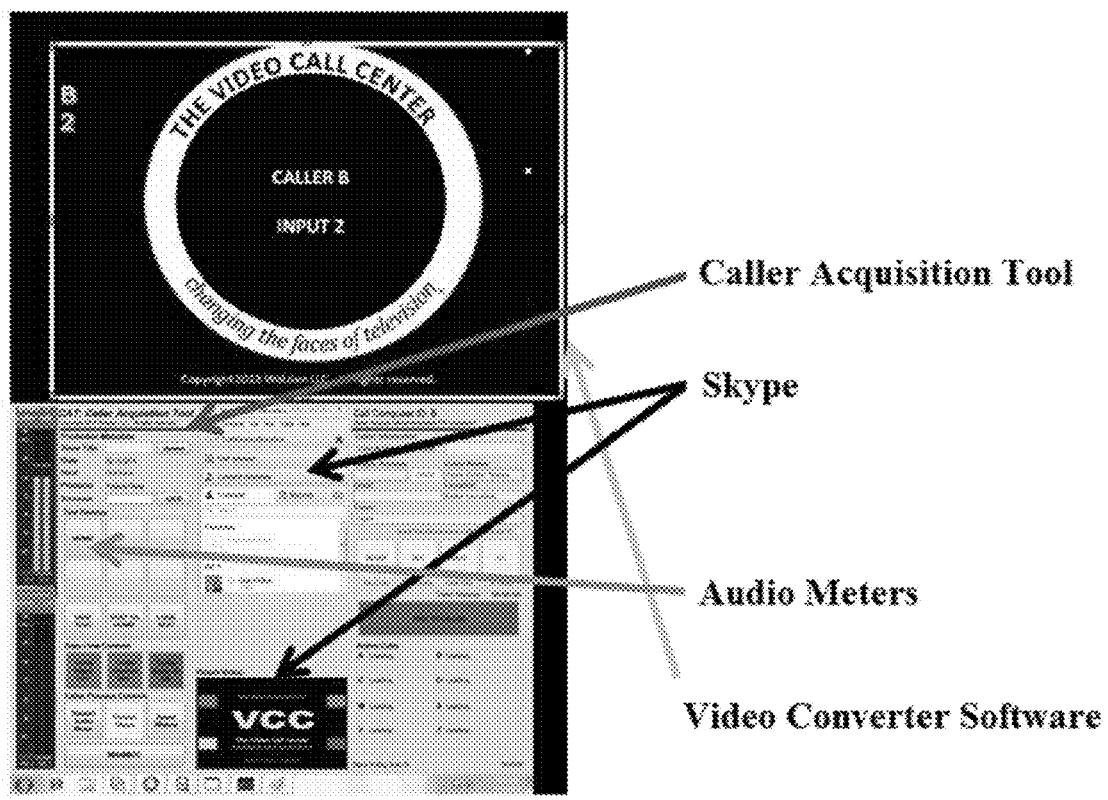
FIG. 14 is a figure depicting a video call center system.

In FIG. 14, there are several different software programs that the Call Screener uses to acquire the call and prepare it for air. Some programs are active and need to be adjusted for each call, others are running, in background but may need to be adjusted.

Caller Acquisition Tool is the overlay that provides a user environment where caller data is entered, the text overlay is set, and there are various controls for other callers.

VoIP application (e.g. Skype® ID) is used for IP Video. There are three Skype® windows: the call control where calls can be made and prior callers tracked, the Return Video window where the video that is going back to the caller can be viewed, and the actual caller window (now shown here) which is placed on the upper screen.

Audio Meters graphically show the caller's audio (bottom) and the return audio (top). Video converter software is running in background, and allows a graphical box on the image preparation screen to be adjusted to crop caller video pictures when, for example, a smartphone picture may be vertical but airs within the normal horizontal television format.

Figure 15:
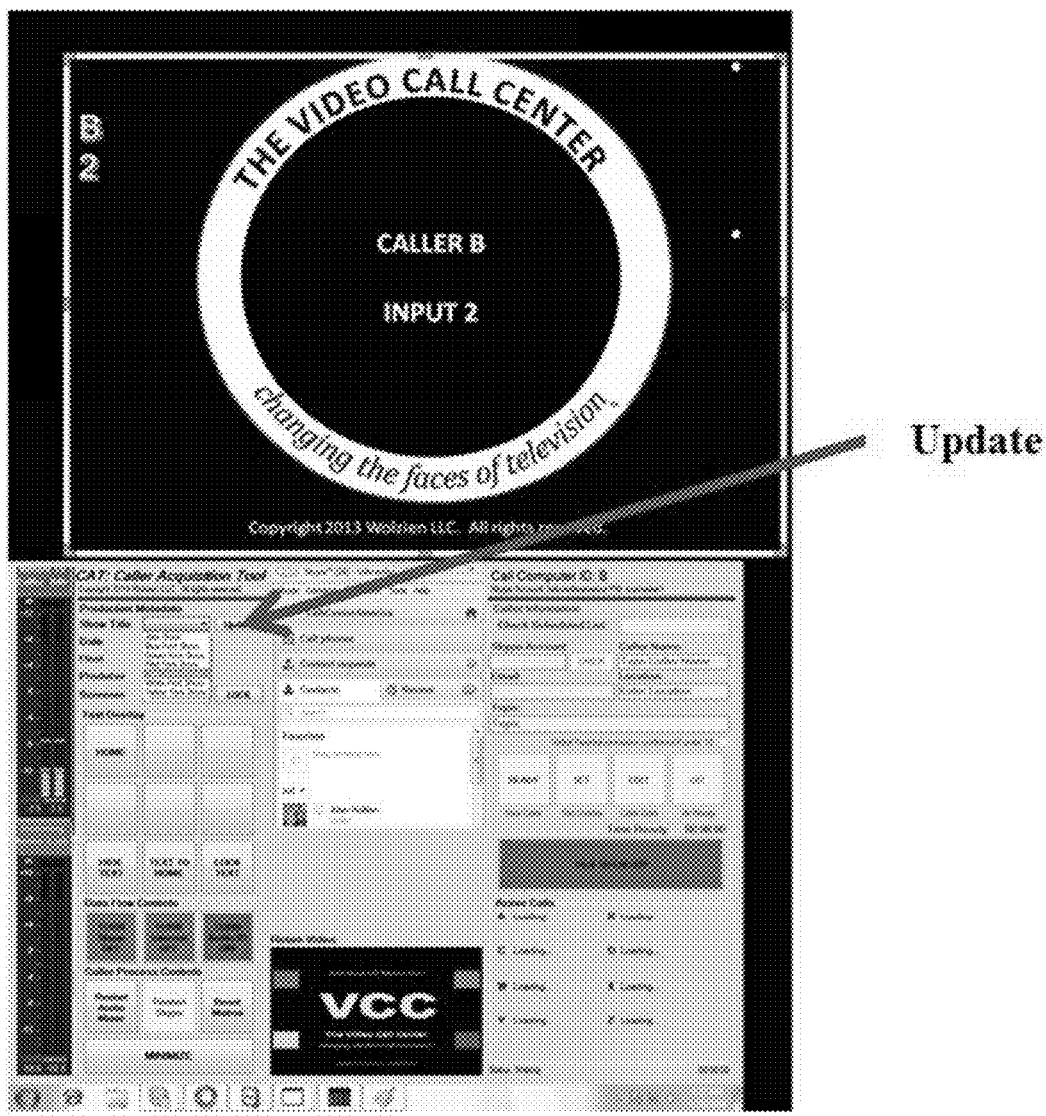
FIG. 15 is a figure depicting a video call center system.
Figure 16:
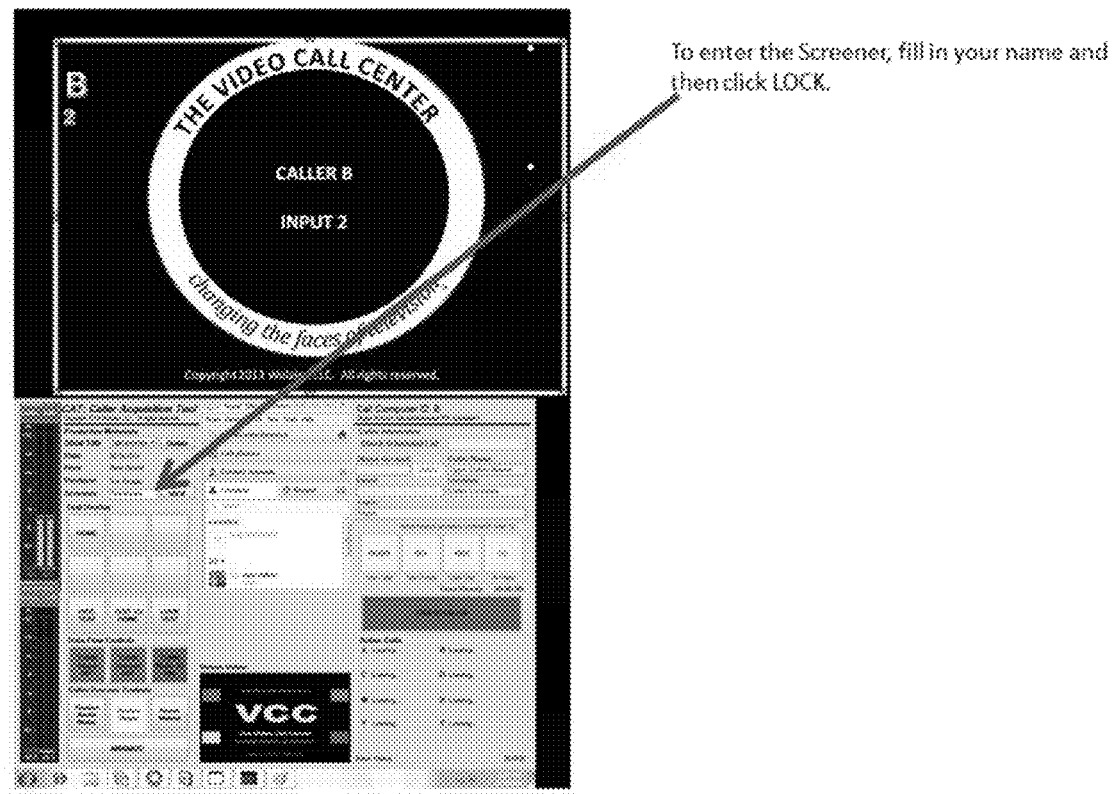
FIG. 16 is a figure depicting a video call center system.
Figure 17:
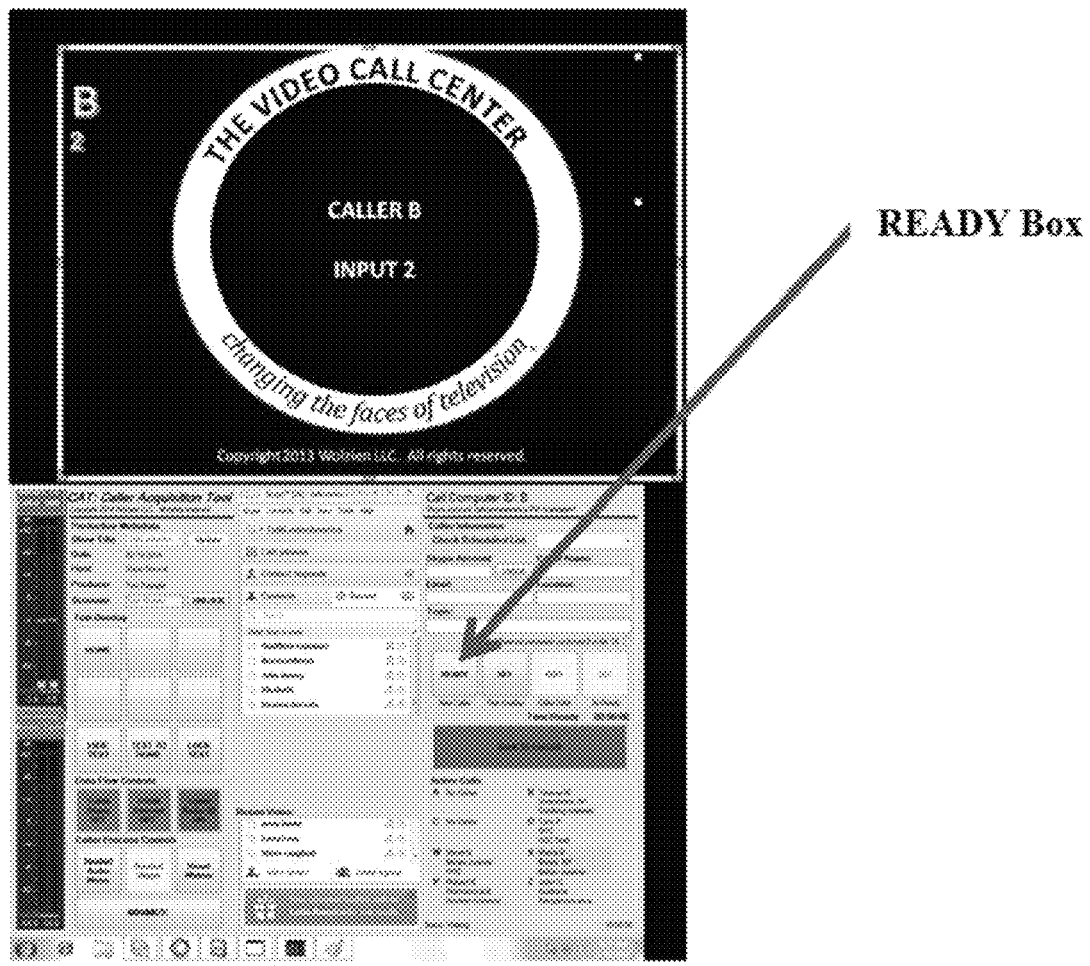
FIG. 17 is a figure depicting a video call center system.
Figure 18:
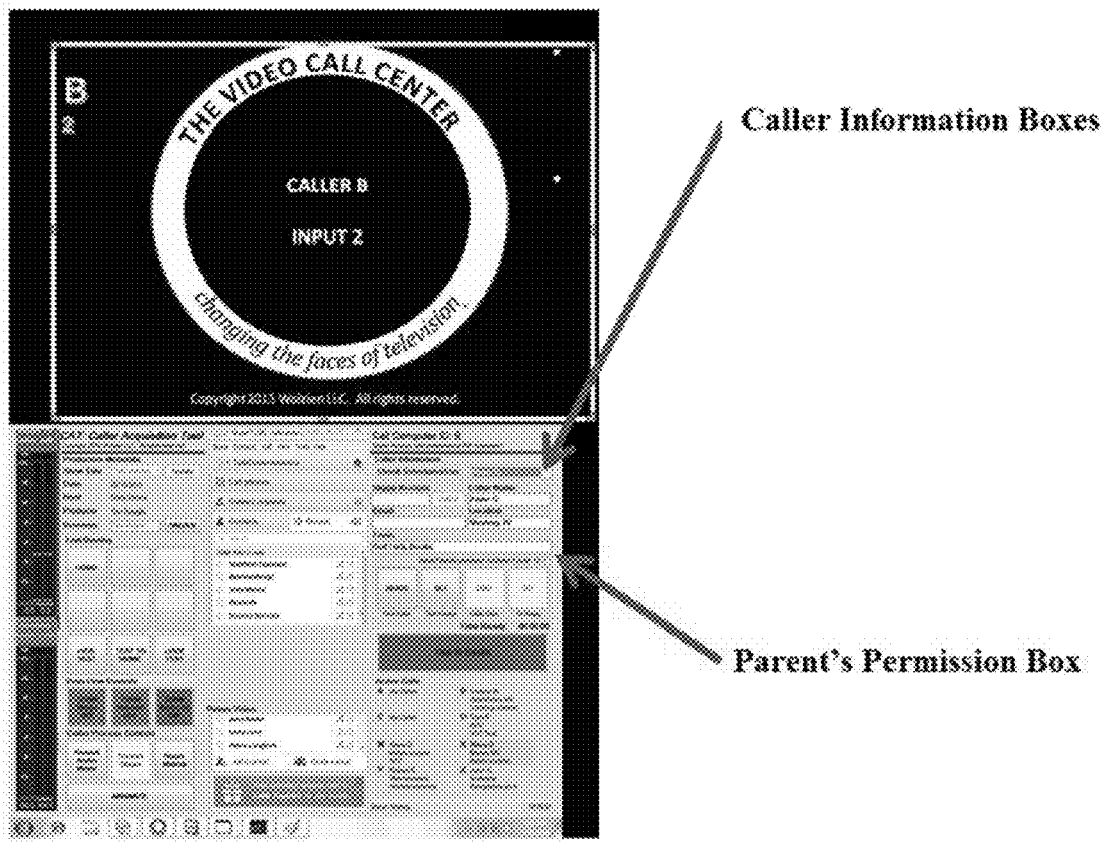
FIG. 18 is a figure depicting a video call center system.
Figure 19:
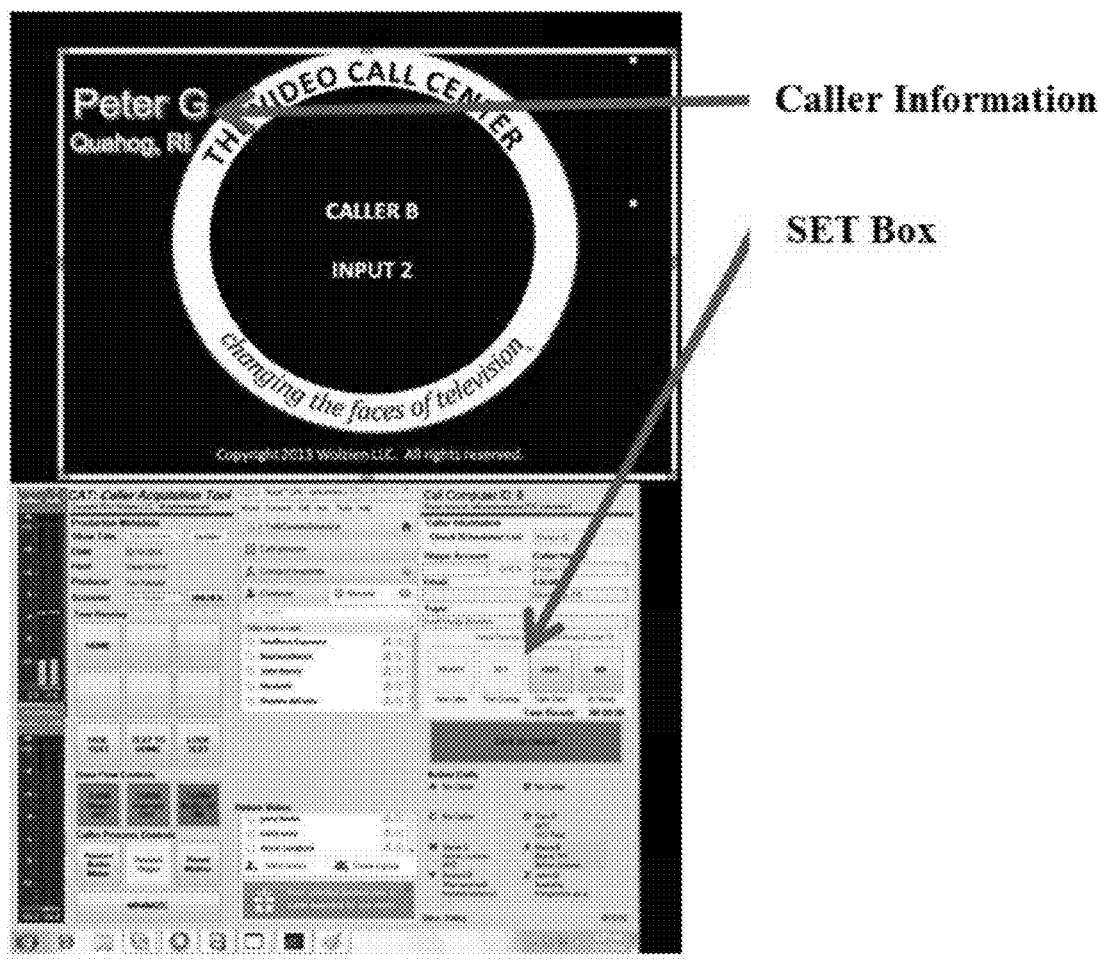
FIG. 19 is a figure depicting a video call center system.
Figure 20:
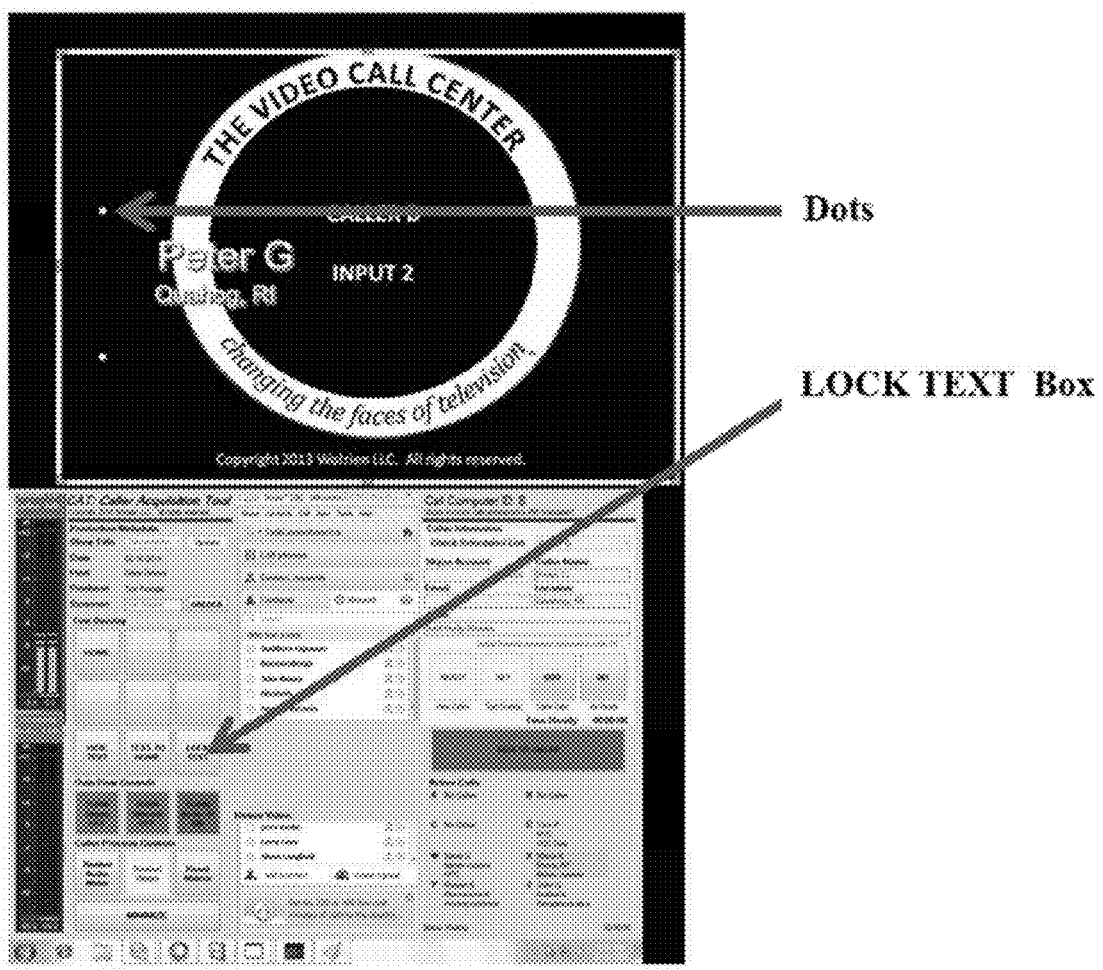
FIG. 20 is a figure depicting a video call center system.
Figure 21:
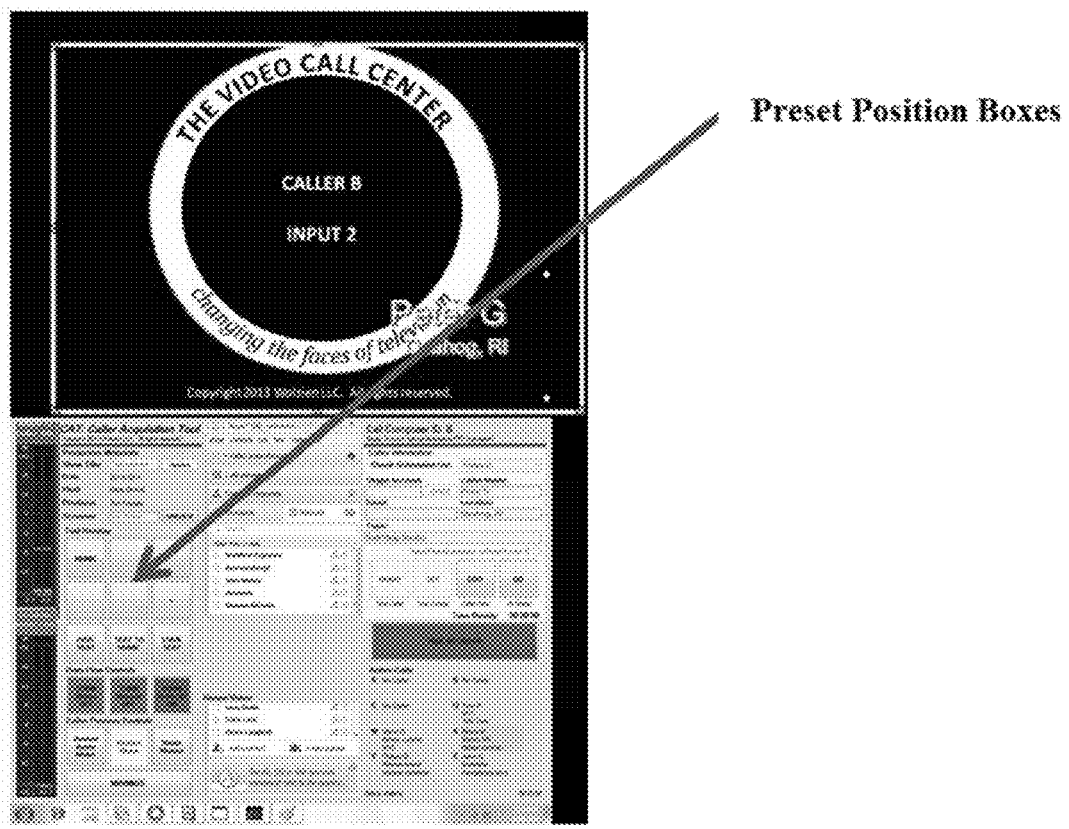
FIG. 21 is a figure depicting a video call center system.
Figure 22:
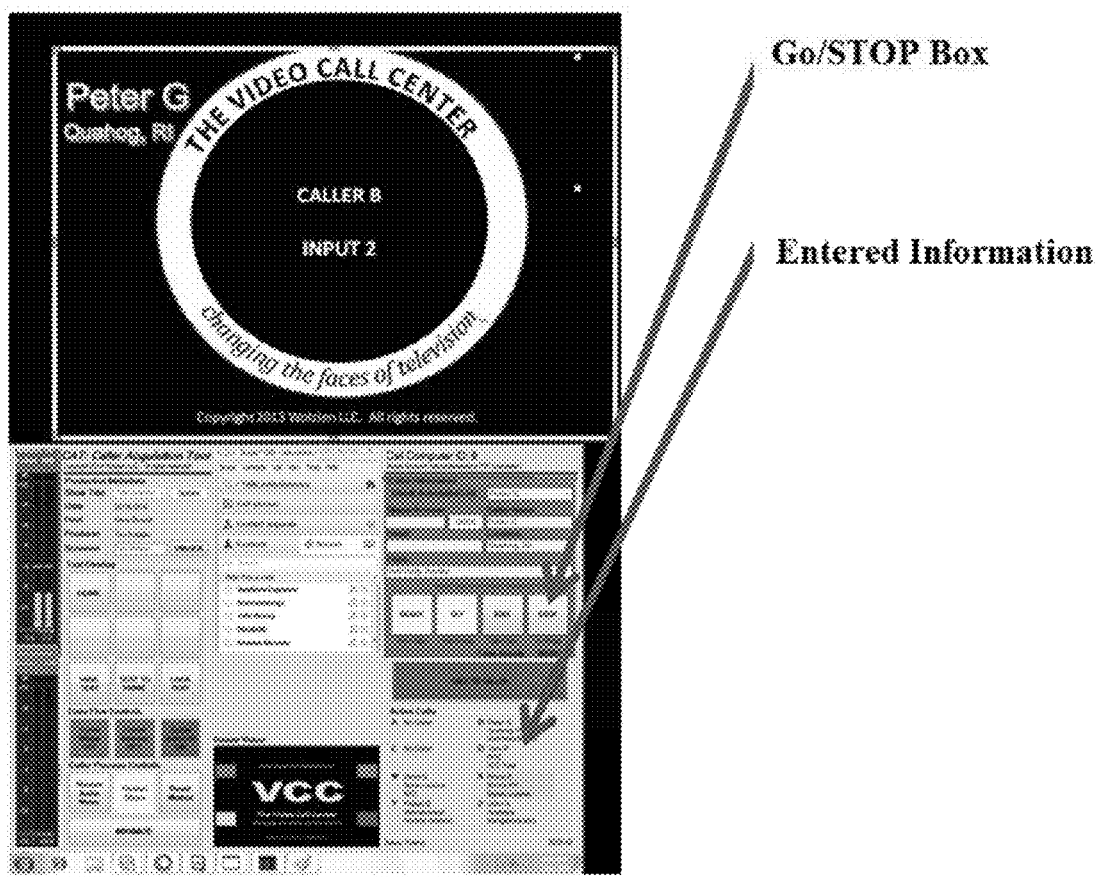
FIG. 22 is a figure depicting a video call center system.

Caller Acquisition Tool (CAT) can be set up for the Show and the Call Screener. To set the show, click UPDATE in the upper left, and then select the show from the drop down bar (FIG. 15). The information of the producer can be entered (FIG. 16). After that, it is ready to set up the first caller. To do this, click on the READY Box on the left center. This will alert the system that the producer will be entering caller data (FIG. 17). There can be two ways to enter caller information. First, caller info can have been previously entered by a producer, and can be accessed by selecting, the caller's name from a drop down list of all the callers pre-entered. Or, each caller's name can be entered individually for those is not on a per-entered list. The Caller Name, Location, and Topic for the system need to be entered to move to the next step. Getting the Skype® ® (or other) IP address and email will be helpful for further contact. In some embodiments, it can include a policy that kids below 18 cannot be put in without parent's permission. In this case, the producer must see the parent on camera giving, permission, and put a check in the box when the kid gets the permission (FIG. 18). Once the data is entered, the producer can click on the SET button, and the text will be displayed over the caller picture on the upper screen (FIG. 19). There can be several ways to adjust the text if the position needs to be changed. Text can be freely moved by putting the mouse on the little white dots near the text, and sliding the text around the screen. The little dots can be seen and moved when the text is UNLOCKED. When it is locked, the text does not move and the little dots cannot be seen (FIG. 20). In some embodiments, the text can also be located into one of six preset positions by clicking the position buttons. Positions are Upper Left (HOME), Upper Center, Upper Right, Lower Right, Lower Center, and Lower Left. The HOME button will always bring the text back to the upper left, regardless of how it has been moved by hand using the little dots (FIG. 21). When everything is ready, the producer hits the GO Key and the data that have been entered will be sent into the database to be seen on the air talent's info screen and in the tower right of all the Call Computer CAT screens. The Go button will change to STOP, and the caller info area will also go red, so it is easy to tell that the call has been cleared for air (FIG. 22). When the call is completed, hit stop, enter any post call notes, and then hit Ready to begin again. When the programs behind the CAT overlay may get out of position, the producer can simply minimize the CAT by hitting the minimize button, slide the displays back where they belong, and then restore the CAT overlay by clicking it in the control bar at the bottom of the screen.

The CAT module can include other buttons:

Hide Text, which the producer would use if there was something on the caller screen that you didn't want to distract from with the text overlay;

Turn Skype® Off, which is used during set up to isolate a different machine by turning Skype® off on all the others;

Turn Internet Of which also turns Skype® off because it uses the web and is used to completely isolate the machine for testing;

Turn Audio ID On/Off plays the audio ID just for this computer and is used in set up and testing. It flashes red when running.

Restart Audio Meter, which restarts the meters.

Restart Skype® ®, which shuts it down and restarts it completely, including login. The producer can see the Skype® name for this computer and the password at the top left of the CAT, just in case the auto login doesn't work and the IP video service must be logged-into manually.

Reset Video Converter, which restarts the video converter software and positions the yellow box in the upper screen back to its starting position. The producer can use this if the yellow box has been changed to crop a prior caller.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art, to which the present invention pertains without departing from its scope. For example, Skype® is used as an example of an internet protocol video service, but other branded and generic IP video services and applications may be substituted.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims. A number of embodiments of the invention have been described. Nevertheless, it will be understood that various modifications may be made without departing from the spirit and scope of the invention. For example, although an embodiment shows that it Call CPU can be dedicated to each caller, a Call CPU can handle the communication and video/audio transmission of more than one caller, each caller via a separate internet video connection.

Other embodiments are within the scope of the following claims.

What is claimed is:

1. A video call-in television system comprising:
a memory and a processor configured to act as:
a plurality of video call central processing units for connecting a plurality of video calls from different callers via the internet, wherein each video call central processing unit is dedicated to a video call;
a caller acquisition module comprising a graphic user interface on at least one touch screen display used by an on-air talent and producer for selecting at least one video call to be aired; and
an output unit for preparing and transmitting the video call signal for transmission live to a video distributor.

2. The video call-in television system of claim 1, wherein the caller acquisition module runs on each video call central processing unit.

3. The video call-in television system of claim 1, wherein the caller acquisition module generates an audio identification tone to represent each different caller, and has an option to turn on or turn off the audio identification.

4. The video call-in television system of claim 1, wherein the caller acquisition module generates a communication path to a voice-over-IP (VoIP) application, the VoIP application uses the internet to make video telephone calls, and has an option to turn on or turn off the communication path.

5. The video call-in television system of claim 1, further comprising two or more video converters for converting video from the video call central processing units into television video.

6. The video call-in television system of claim 1, wherein each video call central processing unit generates a text identification or video call text overlay for a caller, and positions such text identification over the video call, prior to conversion of the video call to a video signal usable in live television with the text now integrated with the video call.

7. The video call-in television system of claim 6, wherein the producer uses the caller acquisition module to set the text overlay to a home position, or any preset positions, to move the text around the screen, to lock the text in a specific position, and to hide the text.

8. The video call-in television system of claim 6, wherein the producer uses the caller acquisition module to enter the caller's name, caller's city, caller's topic, and other information of the caller to the text overlay.

9. The video call-in television system of claim 1, wherein the producer uses the caller acquisition module to send a caller's information to an information screen of the on-air talent and indicate that the caller is "cleared" for air by pressing a "Go" button.

10. The video call-in television system of claim 9, wherein all cleared callers from a multiplicity of video call central processing units are listed on a caller screen by the caller acquisition module.

11. The video call-in television system of claim 10, wherein an amount of time spent after being cleared by a cleared callers from a multiplicity of video call central processing units is indicated on the caller screen using color coding and/or shades of color.

12. The video call-in television system of claim 10, wherein each caller is assigned with a priority level, and the priority of a caller is indicated on the caller screen using color coding and/or shades of color as determined by the producer.

13. The video call-in television system of claim 1, further comprising an ergonomically designed conference controller that permits the on-air talent to add video and audio of multiple callers when desired.

14. The video call-in television system of claim 13, wherein the ergonomically designed conference controller comprises a molded palm mirroring the on-air talent's palm is located on to assist in appropriately locating the on-air talent's hand and fingers in order to minimize errors while the on-air talent is making the selection and looking at a television camera.

15. The video call-in television system of claim 13, wherein the ergonomically designed conference controller permits the on-air talent to jump the video selection to the next in a series of pre-determined video combinations.

16. The video call-in television system of claim 13, wherein the ergonomically designed conference controller permits the on-air talent to jump the video selection to the next combination of the on-air talent and at least one caller in a series of pre-determined video combination.

17. The video call-in television system of claim 13, wherein the ergonomically designed conference controller permits the on-air talent to remove herself from the pre-determined sequence of video combinations, leaving only callers in the sequence.

18. The video call-in television system of claim 13, wherein the ergonomically designed conference controller permits the on-air talent to position one caller in a dominant (featured guest) position on the screen and subsequent video combinations in the per-determined sequence.

19. The video call-in television system of claim 13, wherein the caller acquisition module generates audio communications via a multiplicity of tones to the on-air talent to indicate status of commands delivered through the ergonomically designed conference controller.

20. The video call-in television system of claim 13, wherein the ergonomically designed conference controller permits the on-air talent to air a plurality of basic program elements comprising opens, closes or commercial breaks.

21. The video call-in television system of claim 13, wherein the ergonomically designed conference controller permits the on-air talent to air a video recording or video still.

22. The video call-in television system of claim 13, wherein the ergonomically designed conference controller permits the on-air talent to pause a predetermined sequence of video combinations.

23. The video call-in television system of claim 13, wherein the ergonomically designed conference controller permits the on-air talent to record the outgoing program.

24. The video call-in television system of claim 1, further comprising a "warning tally" light adjacent to each television camera for a next scheduled video picture according to a predetermined sequence.

25. The video call-in television system of claim 1, further comprising a "warning tally" light adjacent to each television camera for the current video picture, indicating by arrow where the on-air talent looks for a next on-camera appearance according to a pre-determined sequence.

26. The video call-in television system of claim 25, wherein the "warning tally" light dynamically adjusts according to the on-air talent's changes to the pre-determined sequence through the ergonomically designed conference controller.

27. The video call-in television system of claim 4, wherein the video call central processing units generate an audio tone of varying frequencies (sweep tone) outside the range of most human hearing as part of the return audio feed to callers for the purpose of keeping automatic audio gain controls of the VoIP application active.

28. The video call-in television system of claim 1, further comprising a host automation module assists the on-air talent in selection of caller video and audio from a multiplicity of callers available from the video call central processing units the video call central processing units.

29. The video call-in television system of claim 28, wherein the caller has been previously cleared for air by the producer.

30. The video call-in television system of claim 28, wherein the host automation module automatically determines a next video shot or combination of shots based on a combination of video options available from the multiplicity of video call central processing units and on-air talent camera options, and sends a signal to the on-air talent to indicate a next video source or combination of video sources that will be on the air, before the video source or combination being placed on the air by a video switcher.

31. The video call-in television system of claim 30, wherein the signal sent by the host automation module to the on-air talent comprises a light signal, text message, or an icon message on a screen.

32. The video call-in television system of claim 28, wherein the host automation module automatically determines a next video shot or combination of shots based on a combination of video options available from the multiplicity of video call central processing units based on a shot rundown routine including shot sequence and timings in simple text language prepared by the producer.

33. The video call-in television system of claim 28, wherein the host automation module dynamically overrides the current sequence, and determines the next video shot or combination of shots based on the video options then available to it from the multiplicity of video call central processing units, based on a change selected by the on-air talent in real time.

34. The video call-in television system of claim 28, wherein the host automation module signals the on-air talent by a plurality of tones of status commands.

35. The video call-in television system of claim 28, wherein the host automation module records available options and actions.

36. The video call-in television system of claim 28, wherein the host automation module comprises at least one application programming interface for communication and modularity.

37. The video call-in television system of claim 1, wherein the on-air talent is in a different location from the video call central processing units.

38. The video call-in television system of claim 28, wherein the on-air talent is in a different location from the host automation module.

39. The video call-in television system of claim 1, wherein the producer is in a different location from the video call central processing units.

40. The video call-in television system of claim 28, wherein the producer is in a different location from the host automation module.

41. The video call-in television system of claim 1, wherein a plurality of separate audio tones of different frequencies is used to identify the video call central processing units.

42. The video call-in television system of claim 1, wherein a caller sees a return video in real time.

43. The video call-in television system of claim 42, wherein the return video comprises a text overlay with information for the caller.

44. A video call-in television system comprising:
a memory and a processor configured to act as:
a plurality of video call central processing units for connecting a plurality of video calls from different callers via the internet, wherein each video call central processing unit is dedicated to a video call;
a caller acquisition module comprising an ergonomically designed conference controller that permits the on-air talent for selecting at least one video call to be aired and adding video and audio of multiple callers when desired; and
an output unit for preparing and transmitting the video call signal for transmission live to a video distributor.

45. The video call-in television system of claim 44, wherein the caller acquisition module runs on each video call central processing unit.

46. The video call-in television system of claim 44, wherein the caller acquisition module generates an audio identification tone to represent each different caller, and has an option to turn on or turn off the audio identification.

47. The video call-in television system of claim 44, wherein the caller acquisition module generates a communication path to a voice-over-IP (VoIP) application, the VoIP application uses the internet to make video telephone calls, and has an option to turn on or turn off the communication path.

48. The video call-in television system of claim 44, further comprising two or more video converters for converting video from the video call central processing units into television video.

49. The video call-in television system of claim 44, wherein each video call central processing unit generates a text identification or video call text overlay for a caller, and positions such text identification over the video call, prior to conversion of the video call to a video signal usable in live television with the text now integrated with the video call.

50. The video call-in television system of claim 49, wherein the producer uses the caller acquisition module to set the text overlay to a home position, or any preset positions, to move the text around the screen, to lock the text in a specific position, and to hide the text.

51. The video call-in television system of claim 49, wherein the producer uses the caller acquisition module to enter the caller's name, caller's city, caller's topic, and other information of the caller to the text overlay.

52. The video call-in television system of claim 44, wherein the producer uses the caller acquisition module to send a caller's information to an information screen of the on-air talent and indicate that the caller is "cleared" for air by pressing a "Go" button.

53. The video call-in television system of claim 52, wherein all cleared callers from a multiplicity of video call central processing units are listed on a caller screen by the caller acquisition module.

54. The video call-in television system of claim 53, wherein an amount of time spent after being cleared by a cleared callers from a multiplicity of video call central processing units is indicated on the caller screen using color coding and/or shades of color.

55. The video call-in television system of claim 53, wherein each caller is assigned with a priority level, and the priority of a caller is indicated on the caller screen using color coding and/or shades of color as determined by the producer.

56. The video call-in television system of claim 44, further comprising a graphic user interface on at least one touch screen display used by an on-air talent and producer for selecting at least one video call to be aired.

57. The video call-in television system of claim 44, wherein the ergonomically designed conference controller comprises a molded palm mirroring the on-air talent's palm is located on to assist in appropriately locating the on-air talent's hand and fingers in order to minimize errors while the on-air talent is making the selection and looking at a television camera.

58. The video call-in television system of claim 44, wherein the ergonomically designed conference controller permits the on-air talent to jump the video selection to the next in a series of pre-determined video combinations.

59. The video call-in television system of claim 44, wherein the ergonomically designed conference controller permits the on-air talent to jump the video selection to the next combination of the on-air talent and at least one caller in a series of pre-determined video combinations.

60. The video call-in television system of claim 44, wherein the ergonomically designed conference controller permits the on-air talent to remove herself from the pre-determined sequence of video combinations, leaving only callers in the sequence.

61. The video call-in television system of claim 44, wherein the ergonomically designed conference controller permits the on-air talent to position one caller in a dominant (featured guest) position on the screen and subsequent video combinations in the per-determined sequence.

62. The video call-in television system of claim 44, wherein the caller acquisition module generates audio communications via a multiplicity of tones to the on-air talent to indicate status of commands delivered through the ergonomically designed conference controller.

63. The video call-in television system of claim 44, wherein the ergonomically designed conference controller permits the on-air talent to air a plurality of basic program elements comprising opens, closes or commercial breaks.

64. The video call-in television system of claim 44, wherein the ergonomically designed conference controller permits the on-air talent to air a video recording or video still.

65. The video call-in television system of claim 44, wherein the ergonomically designed conference controller permits the on-air talent to pause a predetermined sequence of video combinations.

66. The video call-in television system of claim 44, wherein the ergonomically designed conference controller permits the on-air talent to record the outgoing program.

67. The video call-in television system of claim 44, further comprising a "warning tally" light adjacent to each television camera for a next scheduled video picture according to a pre-determined sequence.

68. The video call-in television system of claim 44, further comprising a "warning tally" light adjacent to each television camera for the current video picture, indicating by arrow where the on-air talent looks for a next on-camera appearance according to a pre-determined sequence, wherein the "warning tally" light dynamically adjusts according to the on-air talent's changes to the pre-determined sequence through the ergonomically designed conference controller.

69. The video call-in television system of claim 47, wherein the video call central processing units generate an audio tone of varying frequencies (sweep tone) outside the range of most human hearing as part of the return audio feed to callers for the purpose of keeping automatic audio gain controls of the VoIP application active.

70. The video call-in television system of claim 44, further comprising a host automation module assists the on-air talent in selection of caller video and audio from a multiplicity of callers available from the video call central processing units.

71. The video call-in television system of claim 70, wherein the caller has been previously cleared for air by the producer.

72. The video call-in television system of claim 70, wherein the host automation module automatically determines a next video shot or combination of shots based on a combination of video options available from the multiplicity of video call central processing units and on-air talent camera options, and sends a signal to the on-air talent to indicate a next video source or combination of video sources that will be on the air, before the video source or combination being placed on the air by a video switcher.

73. The video call-in television system of claim 72, wherein the signal sent by the host automation module to the on-air talent comprises a light signal, text message, or an icon message on a screen.

74. The video call-in television system of claim 70, wherein the host automation module automatically determines a next video shot or combination of shots based on a combination of video options available from the multiplicity of video call central processing units based on a shot rundown routine including shot sequence and timings in simple text language prepared by the producer.

75. The video call-in television system of claim 70, wherein the host automation module dynamically overrides the current sequence, and determines the next video shot or combination of shots based 011 the video options then available to it from the multiplicity of video call central processing units, based on a change selected by the on-air talent in real time.

76. The video call-in television system of claim 70, wherein the host automation module signals the on-air talent by a plurality of tones and/or sounds of status commands, the host automation module comprising at least one application programming interface for communication and modularity.

77. The video call-in television system of claim 44, wherein the on-air talent is in a different location from the video call central processing units.

78. The video call-in television system of claim 70, wherein the oil-air talent is in a different location from the host automation module.

79. The video call-in television system of claim 44, wherein the producer is in a different location from the video call central processing units.

80. The video call-in television system of claim 70, wherein the producer is in a different location from the host automation module.

81. The video call-in television system of claim 44, wherein a plurality of separate audio tones of different frequencies is used to identify the video call central processing units.

82. The video call-in television system of claim 44, wherein a caller sees a return video of the program in real time.

83. The video call-in television system of claim 82, wherein the return video comprising a text overlay with information for the caller.

84. A video call-in television system comprising:
a memory and a processor configured to act as:

a plurality of video call central processing units for connecting a plurality of video calls from different callers via the internet, wherein each video call central processing unit is dedicated to a video call;

a host automation module assists the on-air talent in selection of caller video and audio from a multiplicity of callers available from the video call central processing units the video call central processing units;

a caller acquisition module comprising an ergonomically designed conference controller and a graphic user interface on at least one touch screen display used by an on-air talent and producer that permits the on-air talent for selecting at least one video call to be aired and adding video and audio of multiple callers when desired; and an output unit for preparing and transmitting the video call signal for transmission live to a video distributor.

85. The video call-in television system of claim 84, wherein the caller acquisition module generates a communication path to a voice-over-IP (VoIP) application, the VoIP application using the internet to make video telephone calls, and has an option to turn on or turn off the communication path.

* * * * *